(12) United States Patent
Weverka et al.

(10) Patent No.: US 7,194,206 B2
(45) Date of Patent: Mar. 20, 2007

(54) VARIABLE-DENSITY OPTICAL CROSS-CONNECT ARCHITECTURES AND UPGRADES

(75) Inventors: Robert T. Weverka, Boulder, CO (US); Edward J. Bortolini, Nederland, CO (US); Richard W. Urie, Arvada, CO (US); Phillip Clark, Boulder, CO (US)

(73) Assignee: Altera Corporation, San Jose, CA (US)

( * ) Notice: Subject to any disclaimer, the term of this patent is extended or adjusted under 35 U.S.C. 154(b) by 766 days.

(21) Appl. No.: 10/147,181

(22) Filed: May 15, 2002

(65) Prior Publication Data
US 2004/0208550 A1 Oct. 21, 2004

(51) Int. Cl.
*H04J 14/00* (2006.01)
(52) U.S. Cl. .................. 398/45; 398/46; 398/49; 398/50
(58) Field of Classification Search .............. 398/5, 398/12, 45–47, 49–51, 55–56
See application file for complete search history.

(56) References Cited

U.S. PATENT DOCUMENTS

| | | | |
|---|---|---|---|
| 5,414,540 A | 5/1995 | Patel et al. | |
| 5,450,224 A * | 9/1995 | Johansson | 398/50 |
| 5,450,225 A * | 9/1995 | Bostica et al. | 398/54 |
| 5,917,625 A | 6/1999 | Ogusu et al. | |
| 5,960,133 A | 9/1999 | Tomlinson | |
| 5,999,672 A | 12/1999 | Hunter et al. | |
| 6,097,519 A | 8/2000 | Ford et al. | |
| 6,097,859 A | 8/2000 | Solgaard et al. | |
| 6,108,471 A | 8/2000 | Zhang et al. | |
| 6,307,657 B1 | 10/2001 | Ford | |
| 6,741,811 B2 * | 5/2004 | Nishi et al. | 398/50 |
| 6,792,207 B2 * | 9/2004 | Iannone et al. | 398/51 |

FOREIGN PATENT DOCUMENTS

EP 1096713 A2 * 5/2001

OTHER PUBLICATIONS

U.S. Appl. No. 10/093,844, filed Mar. 8, 2002, Bortolini et al.
U.S. Appl. No. 10/093,843, filed Mar. 8, 2002, Bortolini et al.
U.S. Appl. No. 09/442,061, filed Nov. 16, 1999, Weverka et al.

(Continued)

*Primary Examiner*—Dzung Tran
(74) *Attorney, Agent, or Firm*—Townsend and Townsend and Crew LLP

(57) ABSTRACT

An optical cross connect architecture is provided in which the density of spectral bands on optical signals through the cross connect may vary. The general functionality of such variable-density optical cross connect is to receive input optical signals that each have multiple spectral bands and to transmit output optical signals each having one or more of the spectral bands. A concentrator redistributes the spectral bands from the input optical signals among a smaller number of first intermediate optical signals. A core cross connect redistributes the spectral bands on the first intermediate optical signals among second intermediate optical signals. An expander redistributes the spectral bands on the second intermediate optical signals among a greater number of output optical signals.

47 Claims, 27 Drawing Sheets

OTHER PUBLICATIONS

Ford, Joseph E., et al., "Wavelength Add-Drop Switching Using Tilting Micromirrors," Journal of Lightwave Technology, vol. 17, No. 5, May 1999.

Grade, John D., et al., "A Large-Deflection Electrostatic Actuator for Optical Switching Applications," Solid-State Sensor and Actuator Workshop, Hilton Head, SC, Jun. 4-8, 2000.

Nishi, I., et al., "Broad-Passband-Width Optical Filter for Multi/Demultiplexer Using a Diffraction Grating and a Retroreflector Prism," Electronics Letters, vol. 21, No. 10, May 9, 1985.

Phillippe, P., et al., "Wavelength demultiplexer: using echelette gratings on silicon substrate," Applied Optics, vol. 24, No. 7, Apr. 1, 1985.

Rallison, R.D., "Dense Wavelength Division Multiplexing (DWDM) and the Dickson Grating," White Paper, Jan. 6, 2001.

Sun, Z. J., et al. "Demultiplexer with 120 Channels and 0.29-nm Channel Spacing," IEEE Photonics Technology Letters, vol. 10, No. 1, Jan. 1998.

* cited by examiner

610(3)

Using 1 x 4 WREs

| 1 x 4 Cascaded | 1 x 4 Flat | 1 x 4 OChB |
|---|---|---|
|  |  |  |
|  |  |  |
|  |  |  |
|  |  |  |

616(1)  616(2)  616(3)

VARIABLE-DENSITY OPTICAL CROSS-CONNECT ARCHITECTURES AND UPGRADES

CROSS-REFERENCES TO RELATED APPLICATIONS

This application is related to the following copending, commonly assigned U.S. Patent applications, the entire disclosure of each of which is incorporated herein by reference for all purposes: U.S. patent application Ser. No. 10/093,844, entitled "OPTICAL WAVELENGTH CROSS CONNECT ARCHITECTURES USING WAVELENGTH ROUTING ELEMENTS," filed Mar. 8, 2002 by Edward J. Bortolini et al.; U.S. patent application Ser. No. 10/093,842, entitled "METHODS FOR PERFORMING IN-SERVICE UPGRADES OF OPTICAL WAVELENGTH CROSS CONNECTS," filed Mar. 8, 2002 by Edward J. Bortolini; and U.S. patent application Ser. No. 10/126,189, entitled "MULTI-CITY DWDM WAVELENGTH LINK ARCHITECTURES AND METHODS FOR UPGRADING," filed Apr. 19, 2002 by S. Christopher Alaimo et al. These three applications are sometimes referred to collectively herein as "the copending architecture applications."

BACKGROUND OF THE INVENTION

This application relates generally to fiber-optic communications. This application relates more specifically to optical cross-connect architectures used in fiber-optics applications.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However, multi-wavelength systems generally require multiple SONET/SDH systems operating in parallel to process the many optical channels. This makes it difficult and expensive to scale DWDM networks using SONET/SDH technology. The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable.

Optical wavelength cross connects are configured generally to redirect the individual optical channels on a plurality of input optical fibers to a plurality of output optical fibers. Each incoming channel may be directed to any of the output optical fibers depending on a state of the cross connect. Thus, where there are P input fibers and Q output fibers, the optical wavelength cross connect between them may be considered to be a "PN×QN optical switch." Sometimes herein, the terminology "P×Q optical cross connect" is used to refer to such a cross connect by referring to the numbers of input and output optical fibers, each of which is understood to have the capacity for carrying N channels. As such the "P×Q optical cross connect" terminology may be considered to be a shorthand for describing a arbitrarily configurable PN×QN optical device.

FIG. 1 provides an example of a prior-art 4×4 optical wavelength cross connect 100 for a DWDM system carrying N individual wavelength channels. Each of the N channels on the four input signals 104 may be redistributed in accordance with a state of the cross connect 100 among the four output signals 116. The cross connect 100 functions by splitting each of the input signals 104($i$) with an optical demultiplexer 108($i$) into N signals 120(1 ... N, i) that carry only a single wavelength channel $\lambda_1$ ... N. From each of the optical demultiplexers 108, the signal corresponding to a particular one of the 120($j$, 1 ... 4) is directed to a respective one of N 4×4 optical space switches 110($j$). Each optical space switch 110 may be configured as desired to redirect the four received signals 120 to four transmitted signals 124. The transmitted signals 124 are transmitted to optical multiplexers 112 that recombine the reordered individual-wavelength signals onto the four output signals 116.

The efficiency of an arrangement such as shown in FIG. 1 is limited because it adopts a brute-force-type approach of demultiplexing the four incoming signals into their individual 4N components in order to reroute them. There is a general need in the art for more efficient optical cross-connect architectures.

BRIEF SUMMARY OF THE INVENTION

Embodiments of the invention thus provide an optical cross connect architecture in which the density of spectral bands on optical signals through the cross connect may vary. In many instances, such an arrangement permits the cross connect to be more compact than if it used a single density of spectral bands. The general functionality of the variable-density optical cross connect is to receive a plurality of input optical signals that each have a plurality of spectral bands and to transmit a plurality of output optical signals each having one or more of the spectral bands.

In one embodiment, the cross connect includes a concentrator that redistributes the spectral bands included on the plurality of input optical signals among a plurality of first intermediate optical signals. The number of such first intermediate optical signals is less than the number of input optical signals. A core cross connect redistributes the spectral bands included on the plurality of first intermediate optical signals among a plurality of second intermediate optical signals. An expander redistributes the spectral bands included on the plurality of second intermediate optical signals among the output optical signals. The number of second intermediate optical signals is less than the number of output optical signals. While the connector is generally in optical communication with the core cross connect and the core cross connect is generally in optical communication with the expander, those components need not be in direct optical communication and the variable-density cross connect may include intermediate optical components without exceeding the scope of the invention.

In some embodiments, the core cross connect may be symmetric so that the number of first intermediate optical signals is equal to the number of second intermediate optical signals. In other embodiments, the variable-density cross connect itself may be symmetric so that the number of input optical signals is equal to the number output optical signals.

Various different architectures may be used for each of the component concentrator, core cross connect, and expander structures. In one embodiment, the concentrator comprises a plurality of wavelength routing elements, each of which is adapted for selectively routing wavelength components between a first WRE optical signal and a plurality of second WRE optical signals according to a configurable state. The first WRE optical signal may correspond to one of the first intermediate optical signals. Each of the second WRE optical signals may correspond to one of the input optical signals. The concentrator may additionally include a protection fabric adapted to maintain the desired redistribution of the spectral bands in the event of a failure of one of the wavelength routing elements. In a particular embodiment, the input optical signals are organized as distinct groups so that all of the spectral bands from the input signals within each distinct group are propagated onto a single first intermediate optical signal; for example, spectral bands from distinct pairs of input optical signals may be directed onto respective individual first intermediate optical signals.

The expander may have a similar architecture in some embodiments. In one embodiment, the expander comprises a plurality of wavelength routing elements, each of which is adapted for selectively routing wavelength components between a first WRE optical signal and a plurality of second WRE optical signals according to a configurable state. The first WRE optical signal may correspond to one of the second intermediate optical signals. Each of the second WRE optical signals may correspond to one of the output optical signals. The expander may additionally include a protection fabric adapted to maintain the desired redistribution of the spectral bands in the event of a failure of one of the wavelength routing elements. In a particular embodiment, the output optical signals are organized as distinct groups so that all of the spectral bands on the output signals within each distinct group are received from a single second intermediate optical signal; for example, spectral bands on distinct pairs of output optical signals may be received from respective individual second intermediate optical signals.

In one embodiment, the core cross connect comprises a plurality of wavelength routing elements, each of which is adapted for selectively routing wavelength components between a first WRE optical signal and a plurality of second WRE optical signals according to a configurable state. Equivalents to each of the first intermediate optical signals may be directed to each of the plurality of wavelength routing elements as the plurality of second WRE optical signals. The first WRE optical signal for each of the wavelength routing elements may correspond to one of the second intermediate optical signals. The core cross connect may also comprise a protection fabric adapted to maintain the desired redistribution of the spectral bands.

Embodiments of the invention also permit upgrades of the variable-density optical cross connect. In one such embodiment, the capacity of the core cross connect is upgraded and the capacity of at least one of the concentrator and expander is upgraded. The upgraded portions of the core cross connect and the concentrator or expander are placed in optical communication. In some embodiments, upgrading the capacity of the concentrator or expanded may comprise adding an additional concentrator or expander. In other embodiments, a protection fabric included in the concentrator or expander may be used to upgrade its capacity; the capacity of the concentrator or expander is provided by a plurality of optical components comprised by a working fabric. The upgrade is performed by upgrading the capacity of the protection fabric and sequentially bypassing each of the optical components on the working fabric with the protection fabric so that those optical components may also be upgraded. A similar technique may be used to upgrade the core cross connect when it includes a protection fabric.

In another embodiment, the variable-density cross connect is upgraded to a full-capacity cross connect. A plurality of wavelength routing elements are added to the cross connect and spectral bands are bypassed through at least some of the wavelength routing elements. Bypassing the spectral bands may include bypassing any of the concentrator, core cross connect, and expander, each of which may be removed from the architecture or may be reconfigured as one of the wavelength routing elements added to the architecture. In one embodiment, one of the wavelength routing elements forms part of a protection fabric for the upgraded optical cross connect.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

Figure 1:
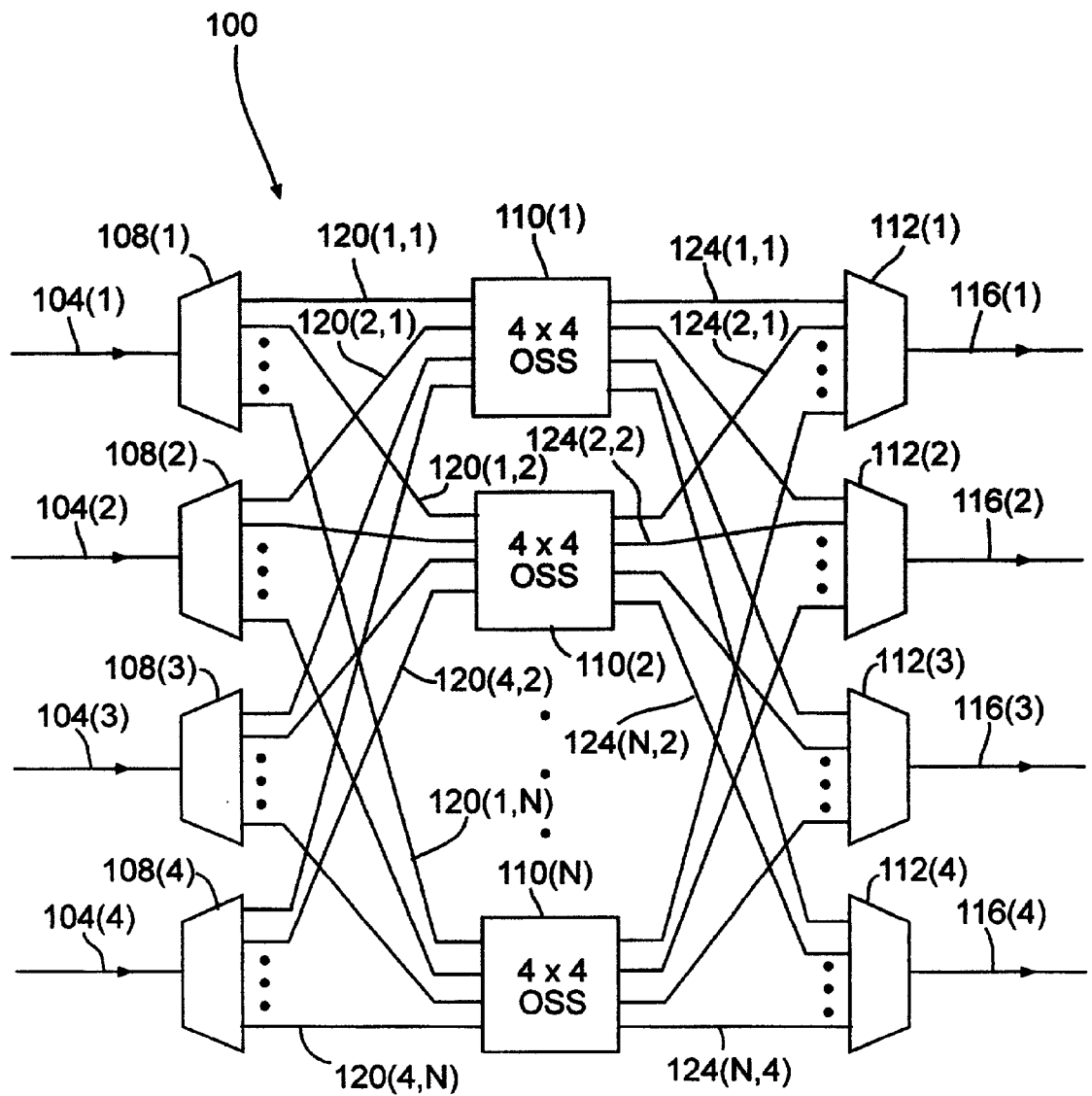
FIG. 1 is a schematic diagram illustrating a prior-art cross connect used in DWDM applications.

The following description sets forth embodiments of optical cross-connect architectures according to the invention. The general operation of such cross-connect architectures is to receive P input signals at respective input ports and output Q output signals at respective output ports. Each of the input and output signals comprises a plurality of spectral bands, with the cross connect capable of achieving a configuration that results in a desired redistribution of input spectral bands corresponding to equivalent channels among the output signals. Although the signals could each have a continuous spectrum, adjacent segments of which could be considered different spectral bands, it is generally contemplated that the spectrum of the incoming light will have a plurality of spaced bands, denoted as corresponding to channels 1, 2, 3, . . . N. In some instances, the examples provided herein focus on symmetric cross connects in which P=Q, but this is not a requirement and embodiments of the invention may readily be adapted to nonsymmetric cross connects also.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. The optical character of the system also permits the input ports and output ports to be interchanged functionally, permitting, for example, a P×Q element to be used as a Q×P element.

The International Telecommunications Union (ITU) has defined a standard wavelength grid having a frequency band centered at 194,100 GHz, and another band at every 50 GHz interval around 194,100 GHz. This corresponds to a wavelength spacing of approximately 0.4 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 100 GHz (corresponding to wavelength spacings of approximately 0.2 nm and 0.8 nm) are also of interest.

2. Wavelength Routing Element

Embodiments of the invention for an optical cross connect include one or more wavelength routing elements ("WRE"). As used herein, a "1×L WRE" refers to an optical device that receives multiplexed light at a WRE input port and redirects subsets of the spectral bands comprised by the multiplexed light to respective ones of a plurality L of WRE output ports. Such a 1×L WRE may be operated as an L×1 WRE by interchanging the functions of the input and output ports. Specifically, a plurality L of optical signals, each multiplexed according to the same wavelength grid are provided at the L output ports (functioning as input ports). A single optical signal is output at the input port (functioning as an output port) and includes spectral bands selected from the L multiplexed optical signals according to the wavelength grid. Thus, the single output optical signal has, at each position on the wavelength grid, no more than one spectral band received at the same position on the wavelength grid from the L multiplexed optical signals. Accordingly, reference herein to a WRE adapted for routing wavelength components "between" a first optical signal and a plurality of second optical signals is intended to include a WRE configured to operate as a 1×L WRE or a WRE configured to operate as an L×1 WRE.

Embodiments for the cross connects that use a WRE may generally use any configuration for routing subsets of a plurality of spectral bands that achieve these functions. In some instances, a particular WRE may be provided in a one-pass, two-pass, four-pass, or other configuration. Some examples of suitable WREs are described in detail below, and additional examples of WREs that may be comprised by certain embodiments are described in the copending, commonly assigned U.S. patent application, filed Nov. 16, 1999 and assigned Ser. No. 09/442,061 ("the '061 application"), entitled "Wavelength Router," by Robert T. Weverka et al., which is herein incorporated by reference in its entirety, including the Appendix, for all purposes.

In some embodiments, wavelength routing functions within the WRE may be performed optically with a free-space optical train disposed between the WRE input port and the WRE output ports, and a routing mechanism. The free-space optical train can include air-spaced elements or can be of generally monolithic construction. The optical train includes a dispersive element such as a diffraction grating. The routing mechanism includes one or more routing elements and cooperates with the other elements in the optical train to provide optical paths that couple desired subsets of the spectral bands to desired WRE output ports. The routing elements are disposed to intercept the different spectral bands after they have been spatially separated by their first encounter with the dispersive element.

Figure 2A:
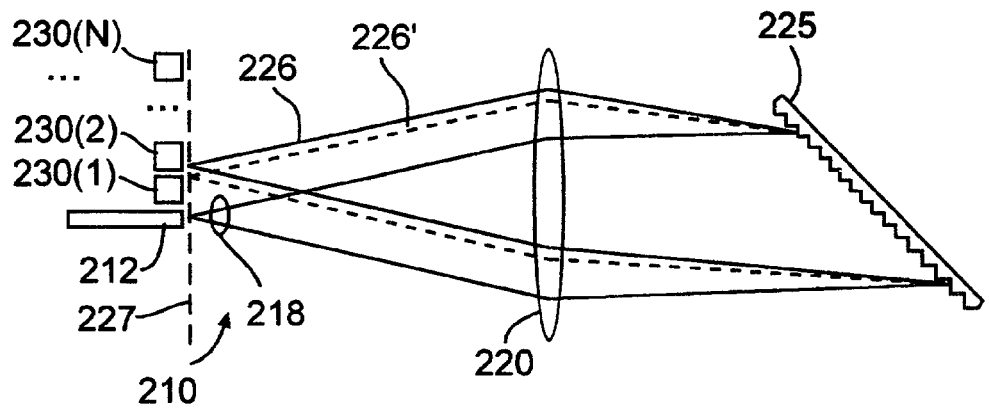
FIGS. 2A, 2B, and 2C are schematic top, side, and end views, respectively, of an optical wavelength routing element used in certain embodiments of the invention.
Figure 2B:
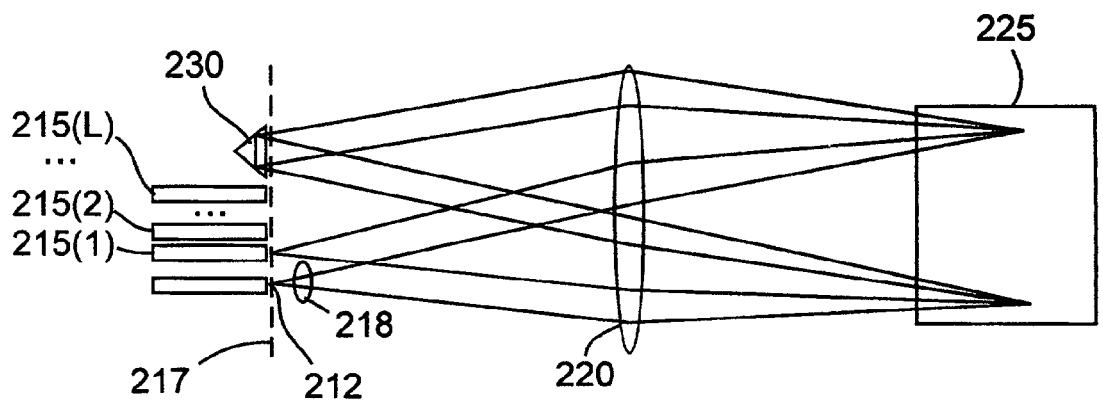
Figure 2C:
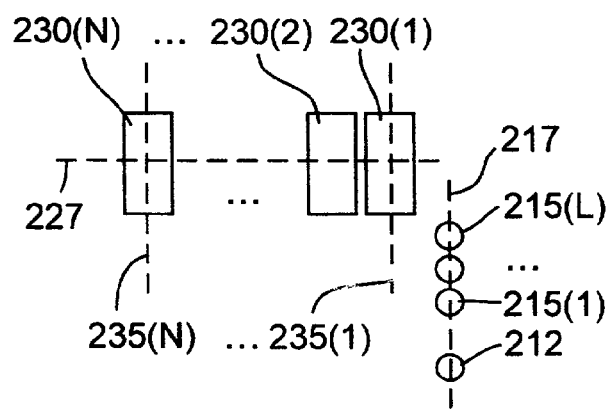

FIGS. 2A, 2B, and 2C are schematic top, side, and end views, respectively, of one embodiment of a 1×L (or, equivalently, L×1) WRE 210. This embodiment may be considered to be a four-pass WRE. Its general functionality is to accept light having a plurality N of spectral bands at a WRE input port 212, and to direct subsets of the spectral bands to desired ones of a plurality L of WRE output ports, designated 215(1) . . . 215(L). The output ports are shown in the end view of FIG. 2C as disposed along a line 217 that extends generally perpendicular to the top view of FIG. 2A. Light entering the WRE 10 from WRE input port 212 forms a diverging beam 218, which includes the different spectral bands. Beam 218 encounters a lens 220 that collimates the light and directs it to a reflective diffraction grating 225. The grating 225 disperses the light so that collimated beams at different wavelengths are directed at different angles back towards the lens 220.

Two such beams are shown explicitly and denoted 226 and 226', the latter drawn in dashed lines. Since these collimated beams encounter the lens 220 at different angles, they are focused towards different points along a line 227 in a transverse plane extending in the plane of the top view of FIG. 2A. The focused beams encounter respective ones of a plurality of retroreflectors, designated 230(1) . . . 230(N), located near the transverse plane. Various examples of micromirror configurations that may be used as part of the retroreflectors, among others, are described in the following copending, commonly assigned applications, each of which is herein incorporated by reference in its entirety for all purposes: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. patent application Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001 by Victor Buzzetta; U.S. patent application Ser. No. 09/899,002, entitled "MEMS-BASED, NONCONTACTING, FREE-SPACE OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3, 2001 by Lilac Muller; U.S. patent application Ser. No. 09/899,014, entitled "METHODS AND APPARATUS FOR PROVIDING A MULTI-STOP MICROMIRROR," filed Jul. 3, 2001 by David Paul Anderson; and U.S. patent application Ser. No. 09/941,998, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland.

The beams are directed back, as diverging beams, to the lens 220 where they are collimated, and directed again to the grating 225. On the second encounter with the grating 225, the angular separation between the different beams is removed and they are directed back to the lens 220, which focuses them. The retroreflectors 230 may be configured to send their intercepted beams along a reverse path displaced along respective lines 235(1) . . . 235(N) that extend generally parallel to line 217 in the plane of the side view of FIG. 2B and the end view of FIG. 2C, thereby directing each beam to one or another of WRE output ports 215.

Figure 3A:
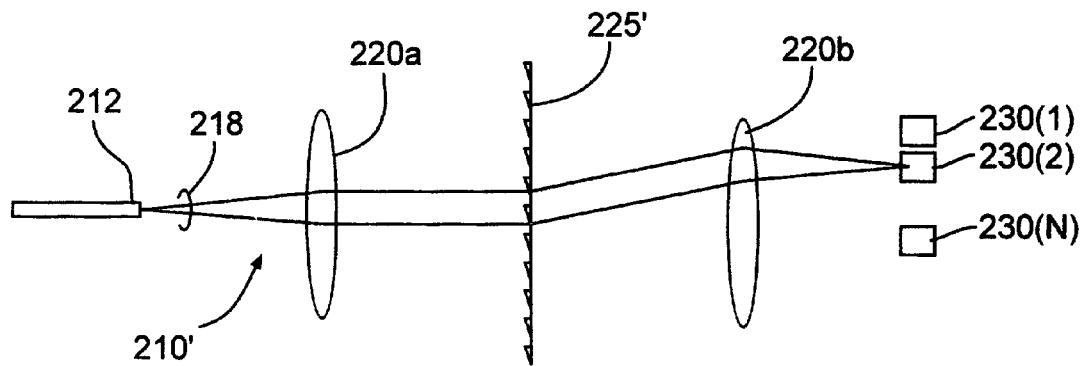
FIGS. 3A and 3B are schematic top and side views, respectively, of an optical wavelength routing element used in certain embodiments of the invention.
Figure 3B:
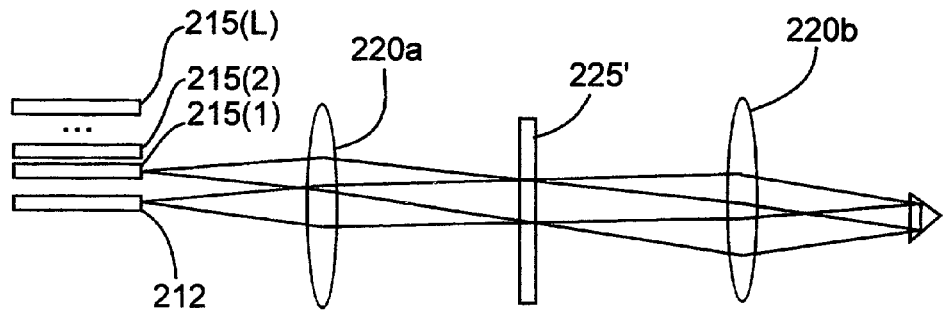

Another embodiment of a WRE, designated 210', is illustrated with schematic top and side views in FIGS. 3A and 3B, respectively. This embodiment may be considered an unfolded version of the embodiment of FIGS. 2A–2C and operates as a two-pass WRE. Light entering the WRE 10' from WRE input port 212 forms diverging beam 218, which includes the different spectral bands. Beam 218 encounters a first lens 220a, which collimates the light and directs it to a transmissive grating 225'. The grating 225' disperses the light so that collimated beams at different wavelengths encounter a second lens 220b, which focuses the beams. The focused beams are reflected by respective ones of plurality of retroreflectors 230, which may also be configured as described above, as diverging beams, back to lens 220b, which collimates them and directs them to grating 225'. On the second encounter, the grating 225' removes the angular separation between the different beams, which are then focused in the plane of WRE output ports 215 by lens 220a.

Figure 4:
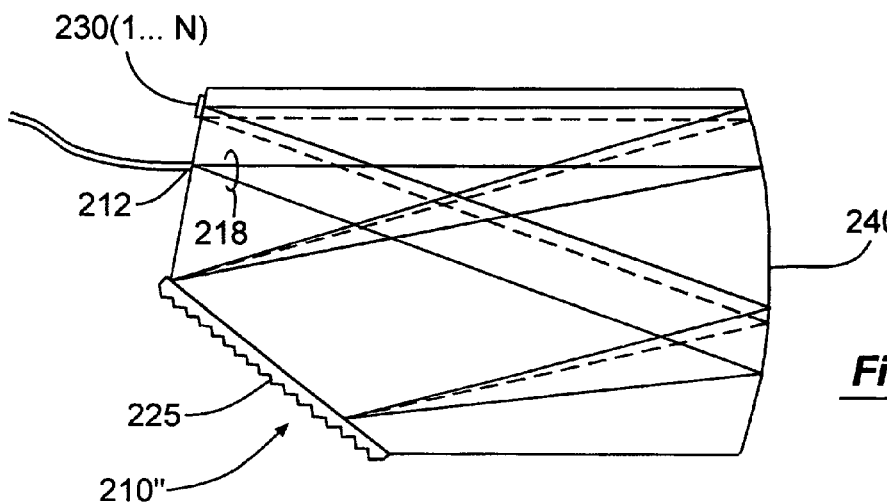
FIG. 4 is a schematic top view of an optical routing element according to a third embodiment of the invention.

A third embodiment of a WRE, designated 210", is illustrated with the schematic top view shown in FIG. 4. This embodiment is a further folded version of the embodiment of FIGS. 2A–2C, shown as a solid glass embodiment that uses a concave reflector 240 in place of lens 220 of FIGS. 2A–2C or lenses 220a and 220b of FIGS. 3A–3B. Light entering the WRE 210" from input port 212 forms diverging beam 218, which includes the different spectral bands. Beam 218 encounters concave reflector 240, which collimates the light and directs it to reflective diffraction grating 225, where it is dispersed so that collimated beams at different wavelengths are directed at different angles back towards concave reflector 240. Two such beams are shown explicitly, one in solid lines and one in dashed lines. The beams then encounter retroreflectors 230 and proceed on a return path, encountering concave reflector 240, reflective grating 225', and concave reflector 240, the final encounter with which focuses the beams to the desired WRE output ports. Again, the retroreflectors 230 may be configured as described above.

3. Cross-Connect Building Blocks

Some of the components of the variable-density optical cross connects described herein may be made in accordance with certain embodiments with L×1 optical elements that may include one or more WREs. Such an element is referred to generically herein as an "L×1 WRE," including arrangements that have more than one WRE, provided at least one WRE is comprised by the element. Thus, one example of an embodiment of an L×1 WRE that may be used in an optical cross connect according to the invention is a single structure that has one input (output) port and L output (input) ports. Other embodiments of an L×1 WRE comprised of smaller WREs are illustrated in FIGS. 5A–5D.

Figure 5A:
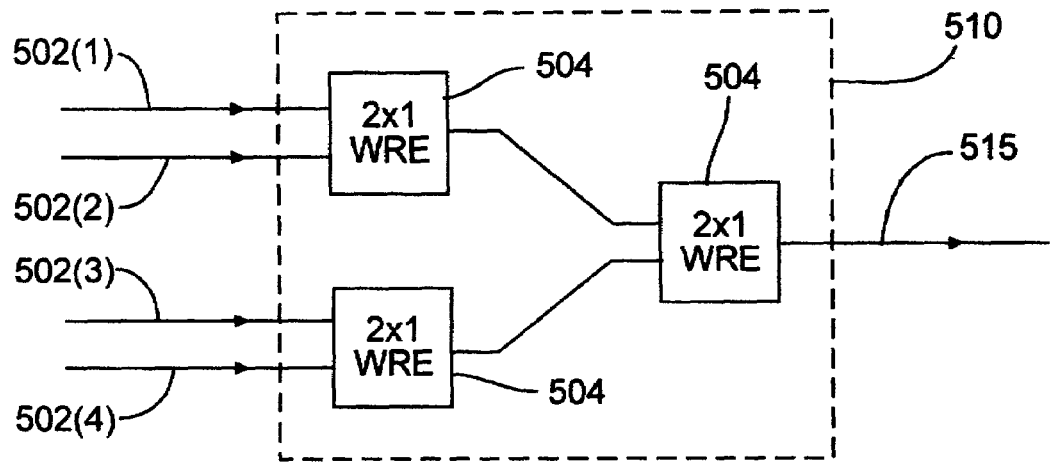
FIGS. 5A–5D are schematic diagrams showing examples of P×1 cross-connect building blocks that include wavelength routing elements in accordance with embodiments of the invention.

For example, FIG. 5A shows how a 4×1 WRE 510 may be configured with three 2×1 WREs. Each of the 2×1 WREs used in any of these embodiments may be configured as one of the WREs described in the '061 application or may be configured according to another WRE design. The 4×1 WRE 510 accepts four input signals 502 and outputs a single output signal 515. The four input signals 502 are received in pairs by two of the 2×1 WREs 504. The outputs from the 2×1 WREs 504 are used as inputs to the third 2×1 WRE, which output the output signal 515.

This arrangement of 2×1 WREs may thus be considered to be a tree arrangement. At each level of the tree, the number of distinct spectral bands across all optical signals at that level is reduced by the action of the 2×1 WREs 504 until, at the final level, only the desired spectral bands remain on the output signal 535. The resulting 4×1 WRE 510 thus functions according to the definition provided above for the operation of a WRE by mapping selected spectral bands from each of the input signals 502 according to a wavelength grid. Such a tree arrangement is an example of a more general class of WREs referred to herein as "cascaded arrangements."

The embodiment of FIG. 5A may also be used as a 1×4 WRE to perform the reverse mapping according to the wavelength grid by interchanging the functions of the input and output ports. In such an instance, spectral bands originating on the single input signal are progressively directed to the desired ones of the plurality of output signals by separating them with the 2×1 WREs 504 at each level of the tree. It is thus evident for a 1×4 WRE (and more generally for a 1×L WRE) that certain wavelength-grid positions of at least some of the output signals will be inactive by carrying no spectral bands.

Figure 5B:
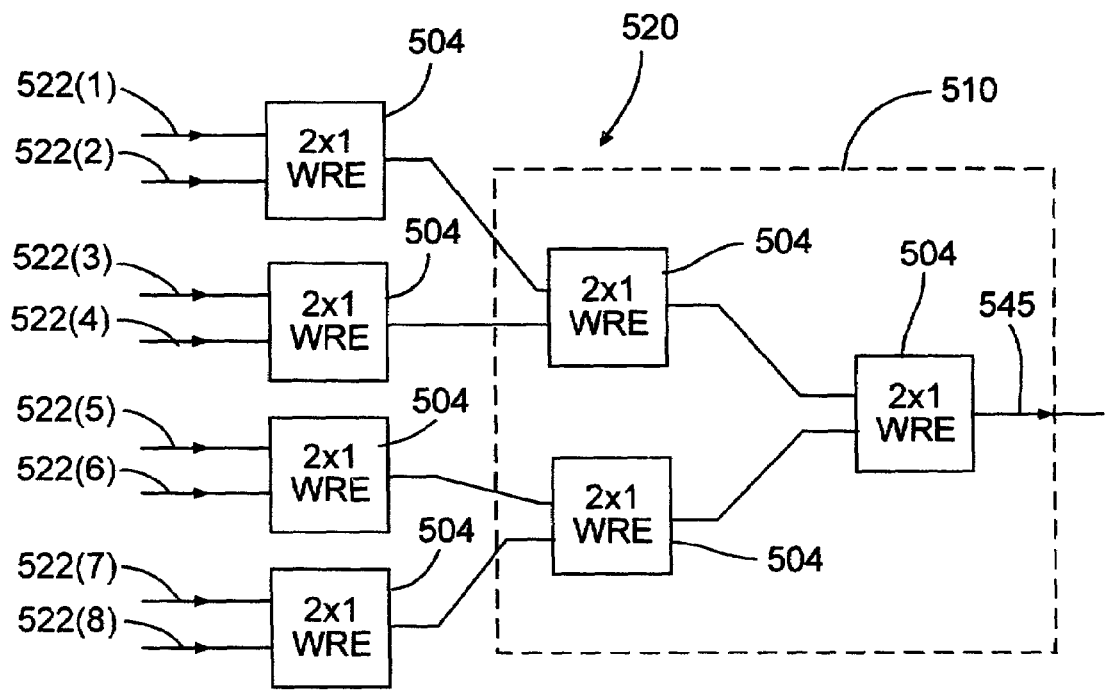

FIG. 5B shows an extension of the tree arrangement of 2×1 WREs 504 to an architecture that provides an 8×1 WRE 520. Spectral bands from eight input signals 522 are routed according to a unique wavelength-grid assignment to a single output signal 525. The eight input signals 522 are received in pairs by four 2×1 WREs 504, and the four outputs from those 2×1 WREs are received by the 4×1 WRE 510 shown in FIG. 5A. The resulting 8×1 WRE 520 functions according to the definition provided above for the operation of a WRE by mapping selected spectral bands from each of the input signals 522 according to a wavelength grid. It may also be used as a 1×8 WRE to perform the reverse mapping according to the wavelength grid by interchanging the functions of the input and output ports.

It is evident that larger WREs may be configured by including more layers in the tree. Adding still another layer of 2×1 WREs to the 8×1 WRE of FIG. 5B results in a 16×1 WRE. More generally, for a tree having p full layers of 2×1 WREs, the resulting element functions as a $2^p \times 1$ WRE, mapping spectral bands from $2^p$ input signals according to a wavelength grid onto a single output port. Such an element may alternatively be used as a $1 \times 2^p$ WRE to perform the reverse mapping according to the wavelength grid by interchanging the functions of the input and output ports.

Figure 5C:
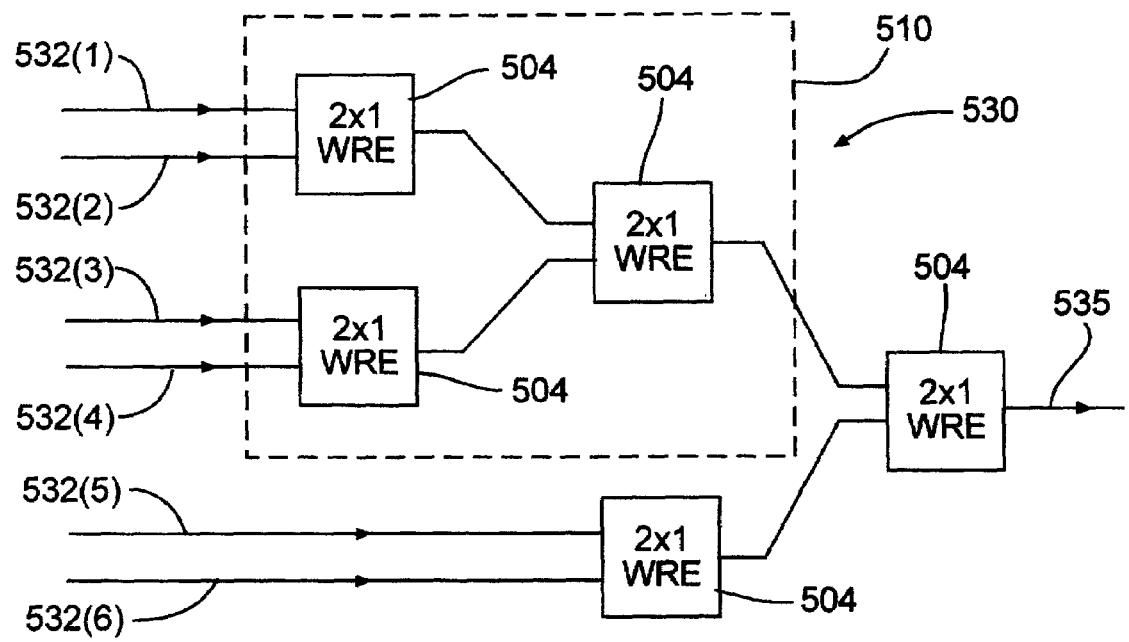

The more general class of cascaded arrangements may be understood by noting that it is not necessary for every level of the tree be completely filled with 2×1 WREs. For example, FIG. 5C provides a schematic illustration of an embodiment similar to that of FIG. 5B except that two of the 2×1 WREs 504 at the widest level of the tree have been removed. Accordingly, this embodiment functions as a 6×1 WRE 530 that maps selected spectral bands from each of six input signals 532 according to a wavelength grid onto a single output signal 535. Interchanging the functions of input and ports results in a reverse mapping according to the wavelength grid so that element 530 functions as a 1×6 WRE. It is noted by showing the component 4×1 WRE 510 with the dashed line that this embodiment may alternatively be considered as a configuration having a complete tree, but with different sizes of WREs on a given level. The 6×1 WRE 530 shown comprises a tree having a 4×1 WRE 510 and a 2×1 WRE 504 on its widest level, these WREs feeding into a 2×1 WRE 504 at the top level.

Figure 5D:
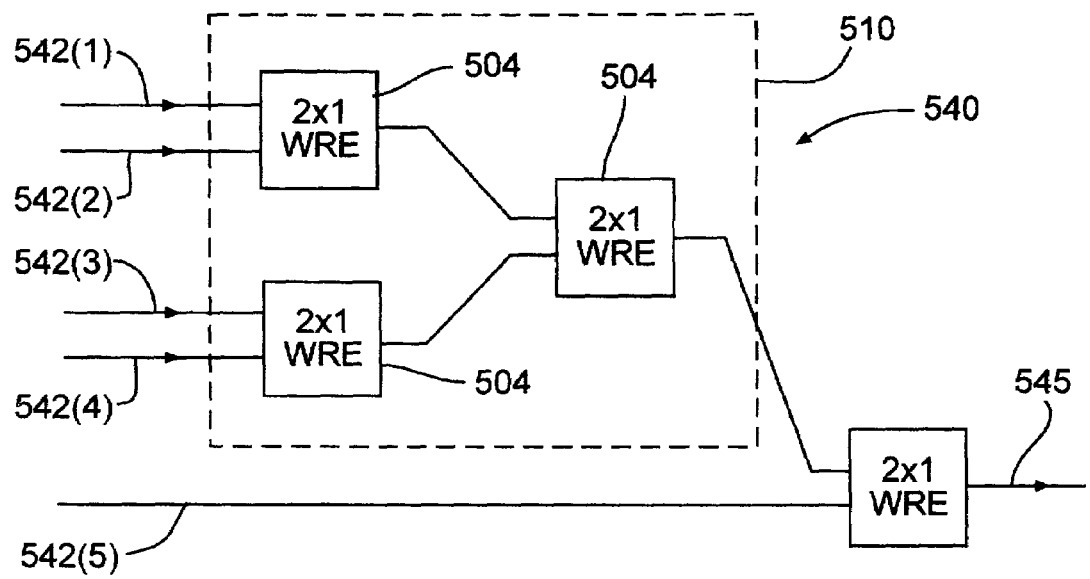

Similarly, FIG. 5D eliminates some 2×1 WREs 504 from two levels of the tree when compared with FIG. 5B. The illustrated embodiment functions as a 5×1 WRE 540 by mapping selected spectral bands from each of five input signals 542 according to a wavelength grid onto a single output signal 545. As for the other embodiments, element 540 may function as a 1×5 WRE by interchanging the functions of the input and output ports. Also, like the embodiment shown in FIG. 5C, element 540 may be considered as having WREs of different sizes, specifically in this example of comprising a 4×1 WRE 510 and a 2×1 WRE 504.

Figure 6A:
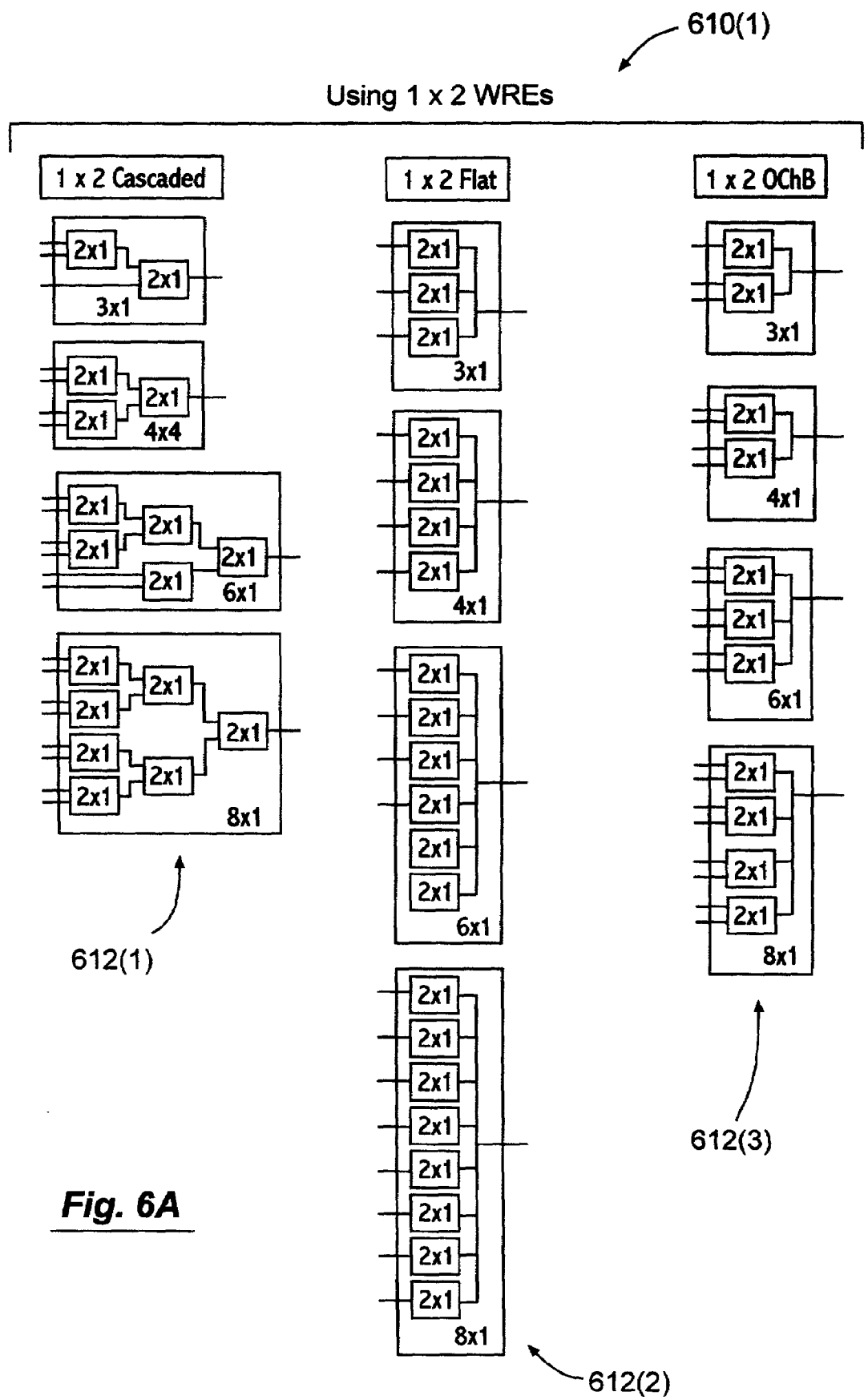
FIGS. 6A–6C schematically summarize various categories of P×1 cross-connect building blocks that include wavelength routing elements in accordance with embodiments of the invention.
Figure 6B:
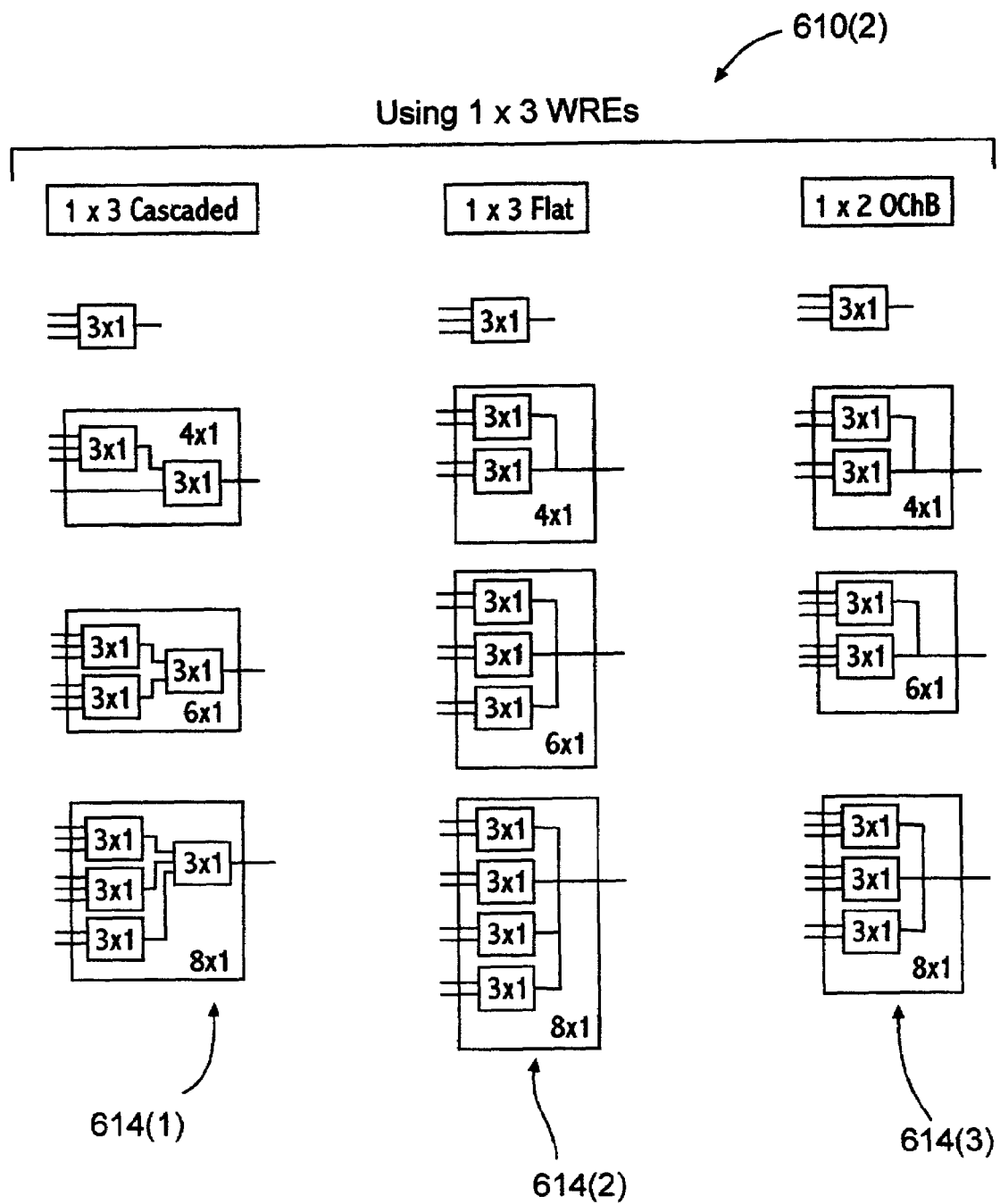
Figure 6C:
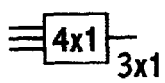
Figure 6C:
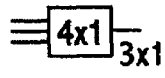
Figure 6C:
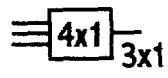
Figure 6C:
Figure 6C:
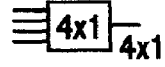
Figure 6C:
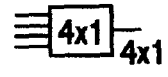
Figure 6C:
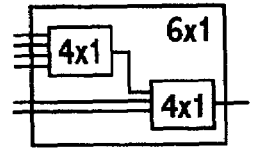
Figure 6C:
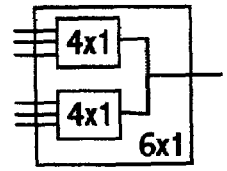
Figure 6C:
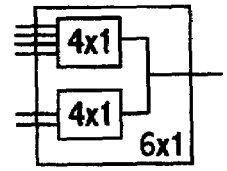
Figure 6C:
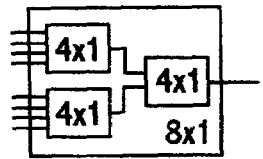
Figure 6C:
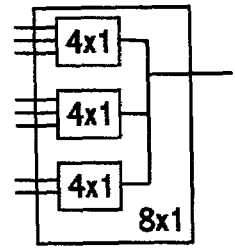
Figure 6C:
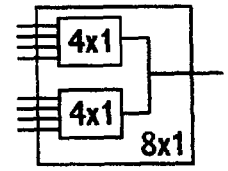

The cascaded arrangements of WREs described with respect to FIGS. 5A–5D are themselves subsets of a more general classification of L×1 WREs that is summarized more comprehensively in FIGS. 6A–6C. The cascaded arrangements are configured so that the output of one component WRE is in optical communication with the input of another component WRE. In addition to such cascaded arrangements, the tabulation shown in FIGS. 6A–6C also provides examples of "flat WRE" embodiments and optical-channel-blocking ("OChB WRE") embodiments. In addition to the other capabilities of WREs, the OChB WREs have the ability to selectively block a spectral band present on the input from appearing at the output. Both the flat and OChB embodiments are characterized by the fact that no component WRE has its output in optical communication with the input of another component WRE. Furthermore, in the flat WRE embodiments, each of the component WREs has an unused port while in the OChB WRE embodiments, at least one of the component WREs has all of its ports used. In particular OChB embodiments, the minimum number of WREs possible of a particular L are used. Such embodiments have advantages of reduced insertion loss, greater reliability, and more modest space requirements than do some other embodiments.

The tabulation in FIGS. 6A–6C illustrates certain examples of 3×1, 4×1, 6×1, and 8×1 WREs that may be made using component 1×2, 1×3, or 1×4 WREs. Such component WREs in this illustration are configured as single structures having one input (output) port and two, three, or four output (input) ports respectively. The three columns of FIG. 6A, denoted collectively by reference numeral 610(1) use component 1×2 WREs, with each of columns 612(1), 612(2), and 612(3) corresponding to cascaded, flat, and OChB configurations respectively. Similarly, the three columns of FIG. 6B, denoted collectively by reference numeral 610(2) use component 1×3 WREs, with each of colunms 614(1), 614(2), and 614(3) corresponding to cascaded, flat, and OChB configurations respectively. Further arrangements using 1×4 WREs are shown in the three columns of FIG. 6C 610(3), also for the cascaded 616(1), flat 616(2), and OChB 616(3) configurations. The tabulation may clearly be extended both in terms of the size of the L×1 WREs and in terms of the component 1×M WREs for arbitrary M and L. Moreover, the tabulation shown is not exhaustive since other configurations that may be grouped according to the classifications are possible, even for those examples of specific L×1 WREs and component 1×M WREs already shown in FIGS. 6A–6C.

In addition, other component WREs may be provided as described in copending, commonly assigned U.S. patent application Ser. Nos. 10/099,392, entitled "ONE-TO-M WAVELENGTH ROUTING ELEMENT," filed Mar. 13, 2002 by Nicholas Charles Cizek and Samuel Paul Weaver and 10/098,805, entitled "TWO-BY-TWO WAVELENGTH ROUTING ELEMENT USING TWO-POSITION MEMS MIRRORS," filed Mar. 13, 2002 by Nicholas Charles Cizek, the entire disclosures of both of which are herein incorporated by reference for all purposes.

4. Variable-Density Cross-Connect Architecture 4.1 Overview

Figure 7A:
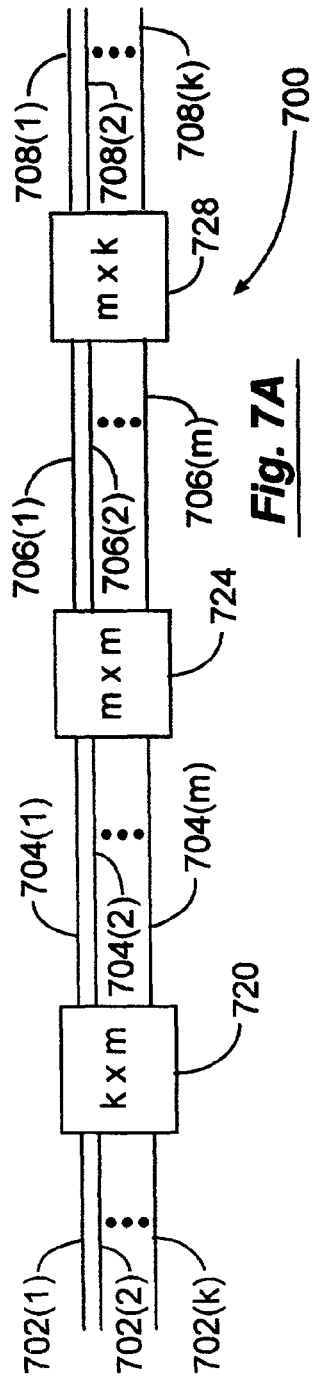
FIG. 7A provides a schematic illustration of a variable-density cross connect in accordance with embodiments of the invention.

Embodiments of the invention include variable-density optical cross-connect architectures, a general overview of which is provided with FIG. 7A. The variable-density cross connect 700 is configured so that spectral bands received on input optical signals 702 may be distributed among output optical signals 708. In the illustration, the cross connect is a symmetric K×K cross connect so that K input optical signals are received and K output optical signals are transmitted. The spectral bands are initially distributed in a particular fashion among the input optical signals and may be differently distributed among the output optical signals according to a configuration of the variable-density cross connect 700. While discussion below focuses primarily on a symmetric architecture, this is not a requirement and the architecture may alternatively be used in asymmetric configurations.

The basic variable-density cross connect 700 architecture includes a concentrator 720 that receives the K input optical signals 702 and acts to concentrate the spectral bands onto a smaller number m of first intermediate optical signals 704. These first intermediate optical signals are received by a core cross connect 724 that acts to redistribute the spectral bands among m second intermediate optical signals 706 according to a configuration of the core cross connect 724. The second intermediate optical signals 706 are themselves redistributed by an expander 728 onto the K output optical signals 708. The nomenclature "variable density" refers generically to the fact that the concentration of spectral bands on the first and second intermediate optical signals 704 and 706 may vary from their concentration on the input and output optical signals 702 and 708.

Such a variable-density configuration may be used advantageously in applications where the density of spectral bands on the input and output optical signals 702 and 708 is less than the capacity of the structure that carries those signals. For example, consider an application in which the input and output optical signals are carried by fibers in a system equipped to accommodate 80 separate wavelength channels, but that only 40 of the channels are in use. In such an application, m could be equal to K/2 so that the 40 channels on pairs of input optical signals are concentrated by the concentrator 720 onto one first intermediate optical signal 704, using the full 80-channel capacity. The m×m core cross connect 724 may thus redistribute the spectral bands on the concentrated signals, with the redistributed spectral bands subsequently being rerouted by the expander 728 onto the full set of K output optical signals. Effectively, the fact that the full channel capacity is unused in the particular application is exploited by using a smaller core cross connect 724 than might be used to achieve full routing flexibility if the full channel capacity were used. In the case where half the channels are used, a K/2×K/2 core cross connect 724 may be used instead of a K×K cross connect, permitting equipment to be used more efficiently. If even fewer channels are used, even smaller core cross connects 724 may be used.

In its most general form, the variable-density optical cross connect may be configured as a $K_1 \times K_2$ cross connect, with a $K_1 \times m_1$ concentrator, an $m_1 \times m_2$ core cross connect, and an $m_2 \times K_2$ expander, with $m_1 < K_1$ and $m_2 < K_2$. The special case of a symmetric variable-density cross connect corresponds to the case where $K_1 = K_2$. In most embodiments, it will convenient for the core cross connect to be symmetric so that $m_1 = m_2$, but this is not required. It will, moreover, be appreciated that the variable-density cross connect 700 may be used in either direction. When light is propagated from right to left, instead of from left to right, the expander 728 functions as a concentrator and the concentrator 720 functions as an expander.

Figure 7B:
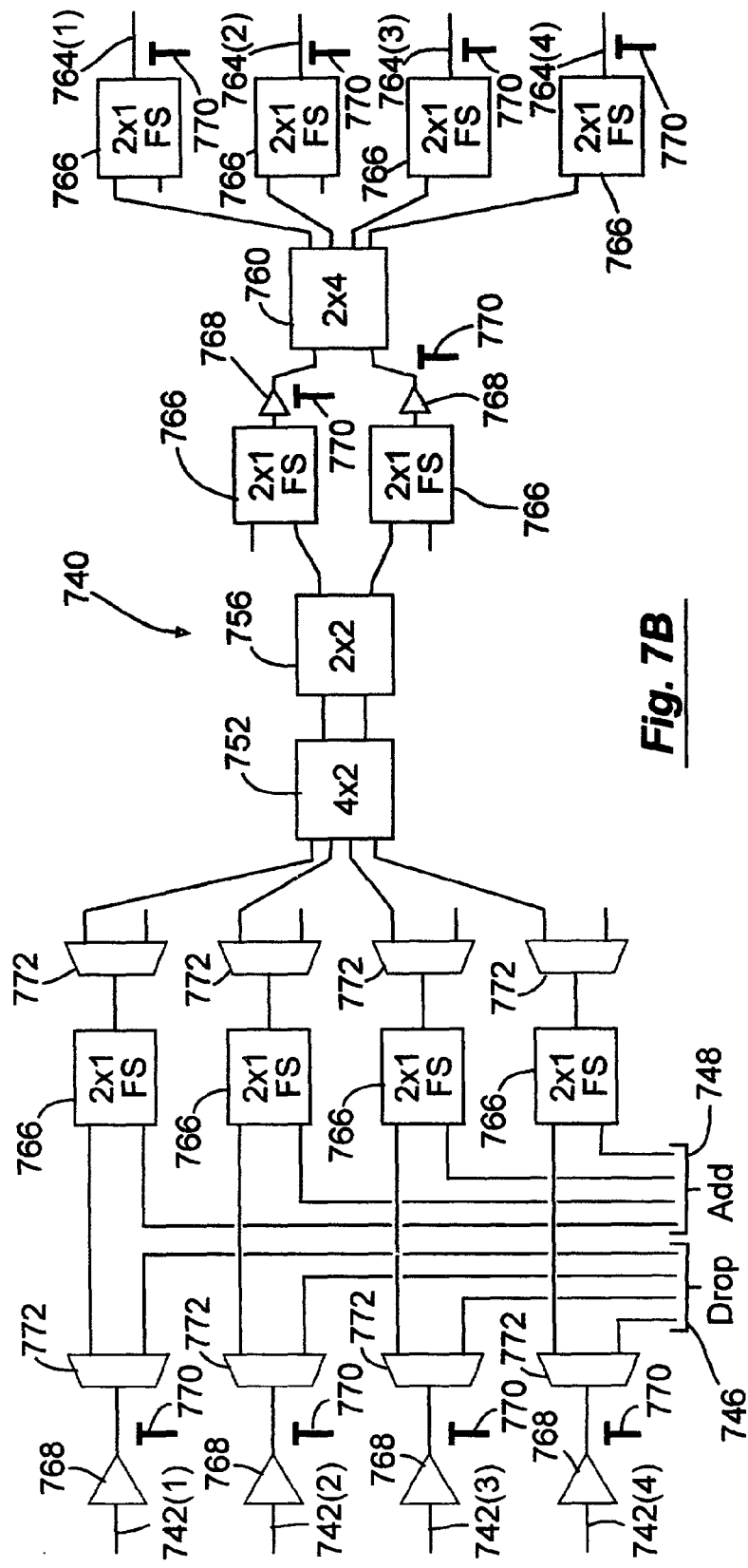
FIG. 7B provides an expanded view of a variable-density cross connect illustrating additional components that may be included in other embodiments of the invention.

FIG. 7B provides an expanded view of the variable-density optical cross connect 740 for a specific embodiment in which $K_1 = K_2 = 4$ and $m_1 = m_2 = 2$. Thus, the illustrated variable-density cross connect may be used as a 4×4 cross connect that permits full routing flexibility provided no more than half the potential wavelength channels are active. This is achieved with a 4×2 concentrator 752, a 2×2 core cross connect 756, and a 2×4 expander 760. The illustration is also used to demonstrate that certain other optical components may be included in the architecture and, in some instances, may be desirable. For example, in some applications, certain spectral bands may be dropped from the input optical signals 742 onto drop signals 746 and other spectral bands may be added from add signals 748. Such an add/drop configuration may be achieved with a set of 1:2 optical couplers 772, each disposed to provide equivalents to each of the input optical signals 742, one equivalent being used as a drop signal and the other equivalent being directed to a 2×1 fiber switch 766 that may select that equivalent or select one of the add signals 748. In such instances, it may be desirable to amplify the input optical signals 742 with amplifiers 768 to compensate for the splitting by the couplers 772. Also included in the architecture 740 may be another set of optical couplers 772, a set of 2×1 fiber switches following the core cross connect 756, and a further set of 2×1 fiber switches following the expander 760. These additional components may be included to facilitate an upgrade of the variable-density cross connect to a full-capacity broadcast-and-select architecture as described in detail below. Additional amplifiers 768 may be included in the architecture to compensate for losses in the system and optical performance monitors 770 may be positioned at various points in the architecture to provide the ability to monitor the operation of the architecture.

4.2 Concentrator/Expander Architectures

The concentrator and expander used in the variable-density optical cross connect may be provided in a variety of different ways. For example, in one embodiment, the concentrator may be provided as an asymmetric full-capacity $K_1 \times m_1$ optical cross connected configured to provide the routing of spectral bands from multiple input signals onto fewer intermediate optical signals. Alternatively, the concentrator may be provided as a larger symmetric full-capacity $K_1 \times K_1$ cross connect in which some of the output ports are simply unused, but which is otherwise configured to provide the desired concentration of spectral bands onto fewer intermediate signals than input signals. Similarly, the expander may be configured in different embodiments as an asymmetric full-capacity $m_2 \times K_2$ cross connect or as a symmetric $K_2 \times K_2$ cross connect, either of which is configured to provide the desired expansion routing spectral bands from $m_2$ intermediate signals onto $K_2$ output signals. In embodiments in which the concentrator and/or expander are provided with full-capacity cross-connect architectures, any such full-capacity architecture may be used. A variety of such full-capacity architectures are described in the copending architecture applications, including the broadcast-and-select architecture, the distribute-and-select architecture, and the distribute-and-combine architecture, among others, any of which may be configured to function as a concentrator or expander. Moreover, in different embodiments, such an architecture may or may not include a protection fabric.

Figure 8A:
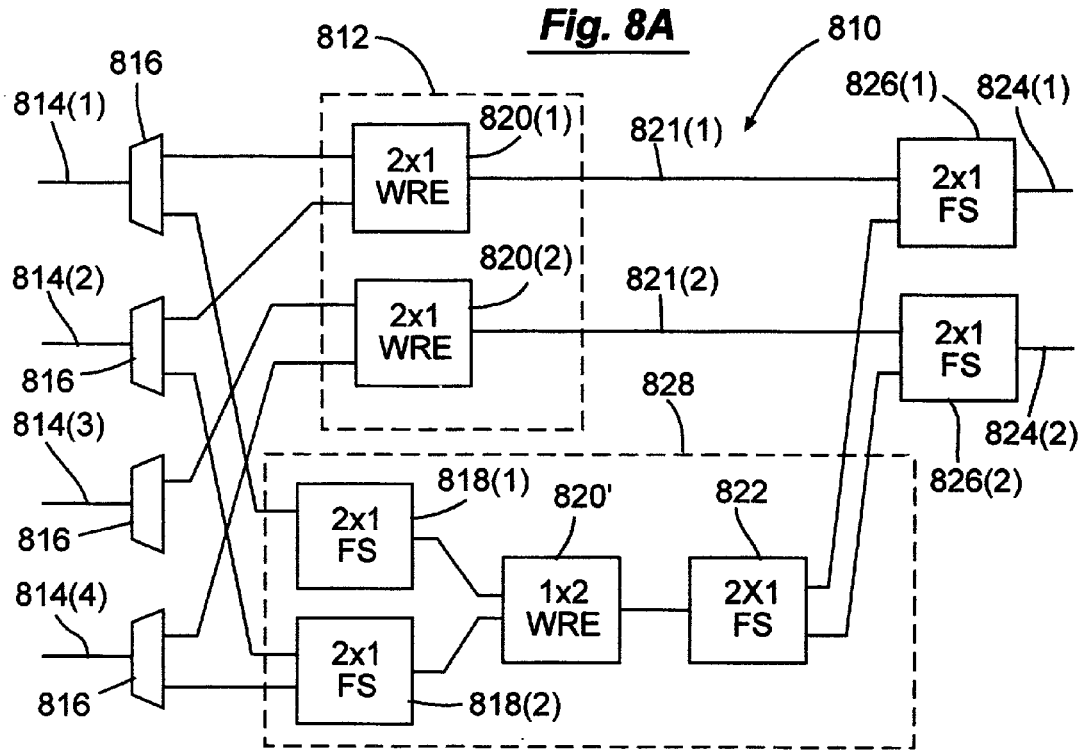
FIG. 8A provides a schematic illustration of a concentrator architecture that may be used in certain embodiments.
Figure 8B:
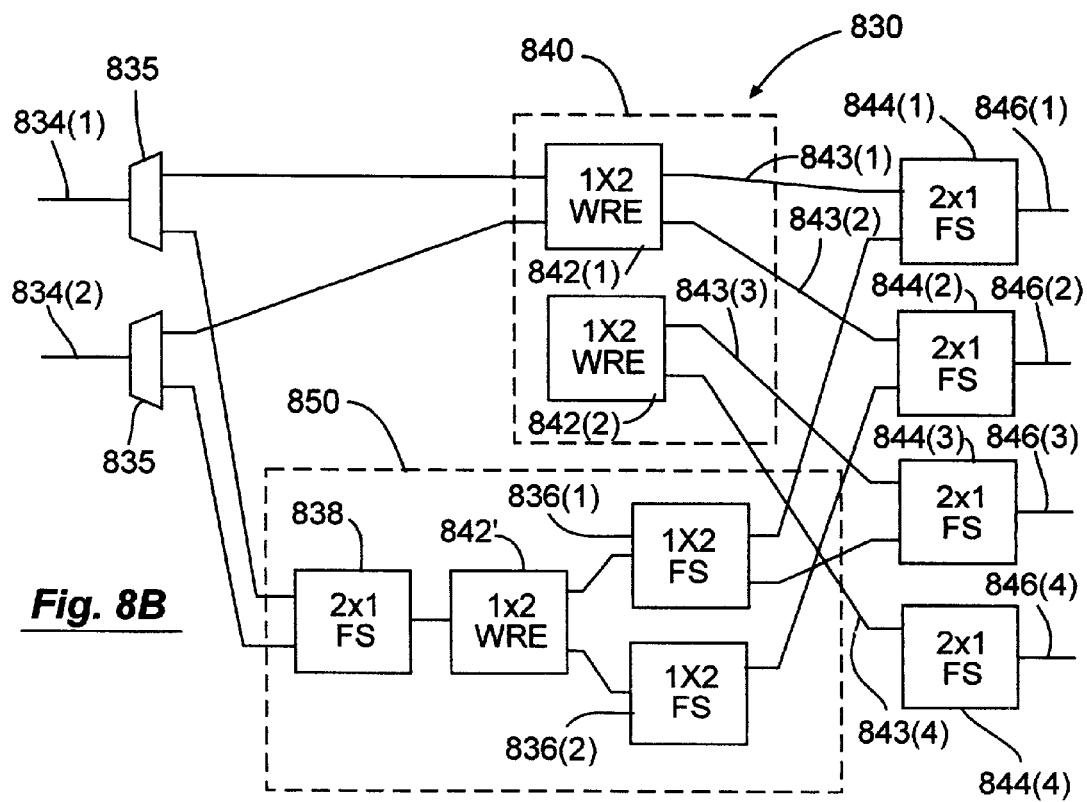
FIG. 8B provides a schematic illustration of an expander architecture that may be used in certain embodiments.

FIGS. 8A and 8B respectively provide illustrations of smaller concentrator and expander architectures that may be used in certain embodiments. These architectures are structured specifically to achieve the concentration and expansion functions, and do not have full configuration capacity that might otherwise be used for other applications. Such specialization permits the concentrator and expander to be provided in a smaller and more efficient architecture. The concentrator and expander may both be considered to be $k_1 \times k_2$ architectures subject to certain constraints, with $k_1 > k_2$ for the concentrator and $k_1 < k_2$ for the expander. In each case, a concentration factor C may be used to characterize the extent to which the spectral-band density is changed, with spectral bands from C signals being concentrated onto or expanded from a single signal. In certain embodiments, the change in density is thus performed with C×1 WREs (or, equivalently, 1×C WREs). The number of such C×1 WREs will generally be at least Int [gr ($k_1$, $k_2$)/C], where gr(x, y) is the greater of x and y and Int(z) is the nearest integer to z greater than or equal to z. In addition, in some embodiments, a protection fabric may be included so that $k_2$ fiber switches are used to select between signals from the WREs or from the protection fabric. The protection fabric generally includes a substitute C×1 WRE and a set of fiber switches on either side of the substitute WRE to allow selection of the signals to be protected.

This general description may be understood more clearly by examining the specific embodiments illustrated in FIGS. 8A and 8B, which may be considered respectively to be a "dual 2×1 cross connect with protection" and a "dual 1×2 cross connect with protection." FIG. 8A shows a 4×2 concentrator 810 with a concentration factor of two so that $k_1$=4, $k_2$=2, and C=2. The working fabric 812 thus comprises two 2×1 WREs 812, each of which receives equivalents to two of the input signals 814 and concentrates the spectral bands on those input signals to an intermediate signal 821. The equivalents are received from 1:2 optical couplers 816 that also direct equivalents to the input signals 814 to a protection fabric 828. Signals output from the protection fabric 828 and the intermediate signals 821 are each received by a 2×1 fiber switch 826 that may be configured to select the signal provided from the working fabric or from the protection fabric 828 as desired. The concentrated signals 824 are output from the fiber switches 826.

The protection fabric 828 includes a substitute 2×1 WRE 820' that may act to replace a corresponding working-fabric 2×1 WRE 820 that is bypassed. It also includes a set of two 2×1 fiber switches 818 disposed to receive equivalents to the input signals 814 from the optical couplers 816, with the specific pair of equivalents directed to the substitute WRE 820' being determined by the configuration of the two 2×1 fiber switches 818. This pair of equivalents corresponds to the pair of equivalents that would otherwise be concentrated by the bypassed working-fabric WRE 820. A further 2×1 WRE 822 on the protection fabric 828 is used to determine to which output fiber switch 826 the concentrated signal output by the substitute WRE 820' is directed.

Similarly, the 2×4 expander shown in FIG. 8B has a concentration factor of two so that $k_1$=2, $k_2$=4, and C=2. The working fabric 840 thus comprises two 1×2 WREs 842 (which may be identical to 2×1 WREs but with light propagated through them in the opposite direction). Each of the 1×2 WREs 842 receives equivalents to one of the input signals 834 and expands the spectral bands on that input signal to two intermediate signals 843. The equivalents are received from 1:2 optical couplers 835 that also direct equivalents to the input signals 834 to a protection fabric 850. Signals output from the protection fabric 850 and the intermediate signals 843 are each received by a 2×1 fiber switch 844 that may be configured to select the signal provided from the working fabric or from the protection fabric 828 as desired. Generally, pairs of the fiber switches 844 will be similarly configured since the failure of a working 1×2 WRE 842 will affect two intermediate signals 843. For example, fiber switches 844(1) and 844(2) may be similarly configured and fiber switches 844(3) and 844(4) may be similarly configured. The expanded signals 846 are output from the fiber switches 844.

The protection fabric 850 includes a substitute 1×2 WRE 842' that may act to replace a corresponding working-fabric 1×2 WRE 842 that is bypassed. It also includes a 2×1 fiber switch 838 disposed to receive equivalents to the input signals 834 from the optical couplers 835, with the specific equivalent directed to the substituted WRE 842' being determined by the configuration of the 2×1 fiber switch 838. The selected equivalent signal corresponds to the equivalent signal that would otherwise be expanded by the bypassed working-fabric WRE 842. A set of 1×2 fiber switches 836 is further provided to direct the expanded signals to the appropriate fiber switches 844 for transmission as output signals 846.

An examination of the protection fabrics 828 and 850 illustrated with FIGS. 8A and 8B shows that they are identical except for the direction in which light is transmitted. More generally, light may be propagated in either direction for the architectures shown in FIGS. 8A and 8B. If light is propagated from right to left in FIG. 8A, for example, the architecture 810 functions as an expander rather than as the concentrator that results from propagating light from left to right. Similarly, if light is propagated from left to right in FIG. 8B, the architecture 830 functions as a concentrator rather than as the expander that results from propagating light from left to right.

4.3 Core Architectures

In some embodiments, the core of the variable-density optical cross connect comprises a full-capacity cross connect so that a spectral band received on any first intermediate signal from the concentrator may be propagated to any of the second intermediate signals transmitted to the expander. Such a full-capacity cross connect may be provided using any of a variety of architectures, some of which are described in detail in the copending architecture applications, including the broadcast-and-select architecture, the distribute-and-select architecture, and the distribute-and-combine architecture, among others. Additionally, provision may be made in embodiments for the full-capacity architecture to include a protection fabric, although such protection is not required.

Figure 9:
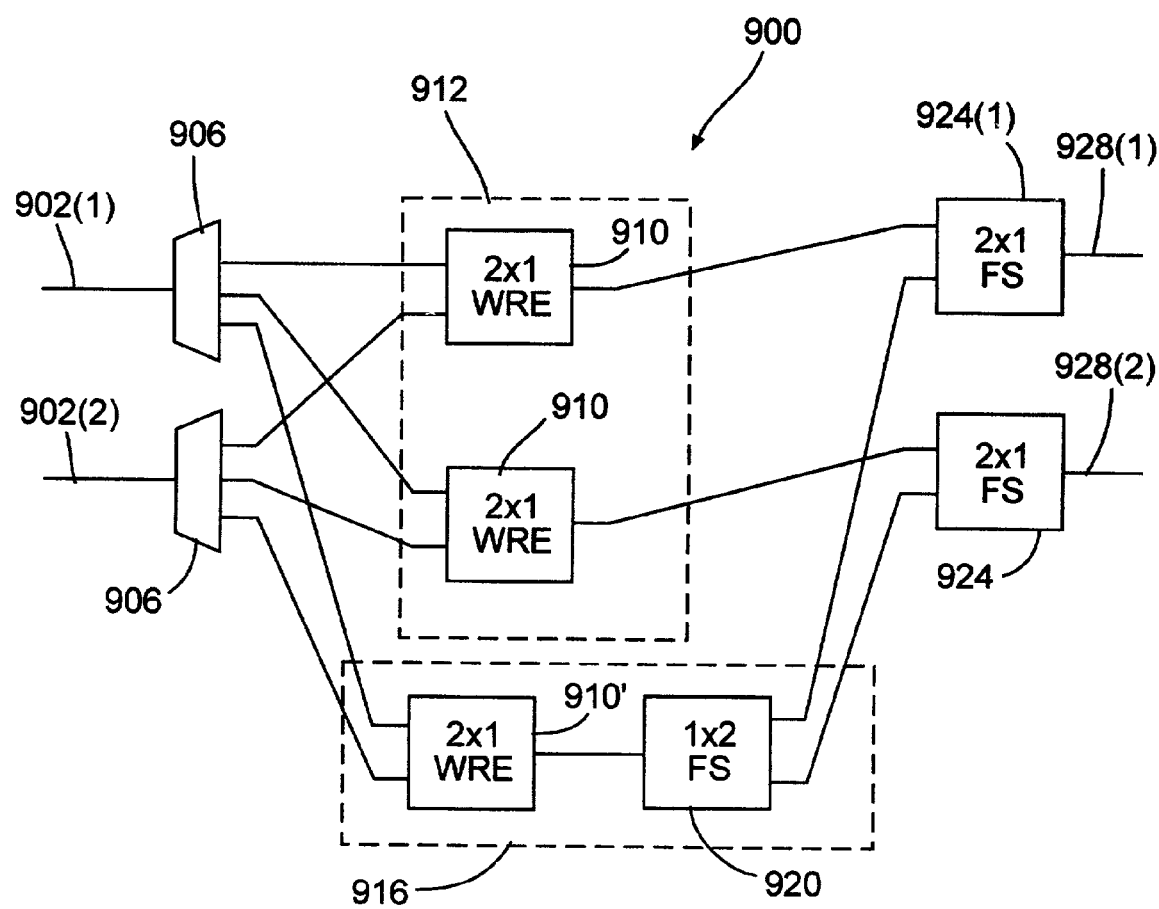
FIG. 9 provides a schematic illustration of a broadcast-and-select architecture that may be used as the core of a variable-density cross connect in certain embodiments.

FIG. 9 explicitly shows one embodiment for a full-capacity cross-connect architecture that uses a broadcast-and-select arrangement with protection. This arrangement is used as an example because certain embodiments described further below permit in-service upgrades of a variable-density cross connect to a broadcast-and-select cross connect, thereby permitting expansion of the variable-density cross connect to a full-capacity cross connect. There is, however, no requirement that the core cross connect necessarily comprise a broadcast-and-select cross connect.

The broadcast-and-select architecture 900 shown in FIG. 9 is a symmetric 2×2 architecture, although it will be evident from the following description how the principles may be used to provide an arbitrary $K_1 \times K_2$ architecture. The illustrated architecture includes both a working fabric 912, through which traffic is normally routed, and a protection fabric 916 that may be used in the event of a failure of a working-fabric component. For a general $K_1 \times K_2$ cross connect, the working fabric 912 includes a number $K_2$ of $K_1 \times 1$ WREs 910, each of which is configured to receive an equivalent to each of the $K_1$ input signals 902 from one of a number $K_1$ of 1:($K_2$+1) optical couplers 906. The protection fabric 916 includes a substitute $K_1 \times 1$ WRE 910' in optical communication with a 1×$K_2$ fiber switch 916. Outputs from the working-fabric WREs 910 and from the protection-fabric fiber switch 916 are in optical communication with a number $K_2$ of 2×1 fiber switches 924, from which the output signals 928 are transmitted. It is straightforward to verify that this generalized description describes the structure that corresponds to that shown in FIG. 9 when $K_1=K_2=2$.

During normal working operation, equivalents to each of the input signals 902 are thus broadcast to the working WREs 910, whose configurations determine which spectral bands from those input signals 902 are to be included on the output signals 928. During such normal working operation, fiber switches 924 are therefore configured to transmit the signal received from the corresponding working WRE 910. In the event of a failure of part of the working fabric, one of the working WREs 910(*j*) may be bypassed by: (1) configuring the substitute WRE 910' to reproduce the operation of WRE 910(*j*); (2) configuring the protection fiber switch 920 to direct the protection signal to fiber switch 924(*j*); and configuring fiber switch 924(*j*) to transmit the signal received from the protection fabric.

4.4 Upgrades of Variable-Density Cross-Connect Architectures

There are at least two distinct types of upgrades that may be performed with a variable-density cross-connect architecture. First, an upgrade may maintain the variable-density character of the architecture but either accommodate a greater number of input and/or output signals from the architecture or use a different concentration factor C internally. Second, an upgrade may convert the variable-density architecture into a full-capacity architecture such as a broadcast-and-select architecture. In each case, it is sometimes desirable for the upgrade to proceed as an in-service upgrade so that existing traffic is uninterrupted.

4.4.1 Upgrades that Maintain Variable-Density Characteristics

Figure 10A:
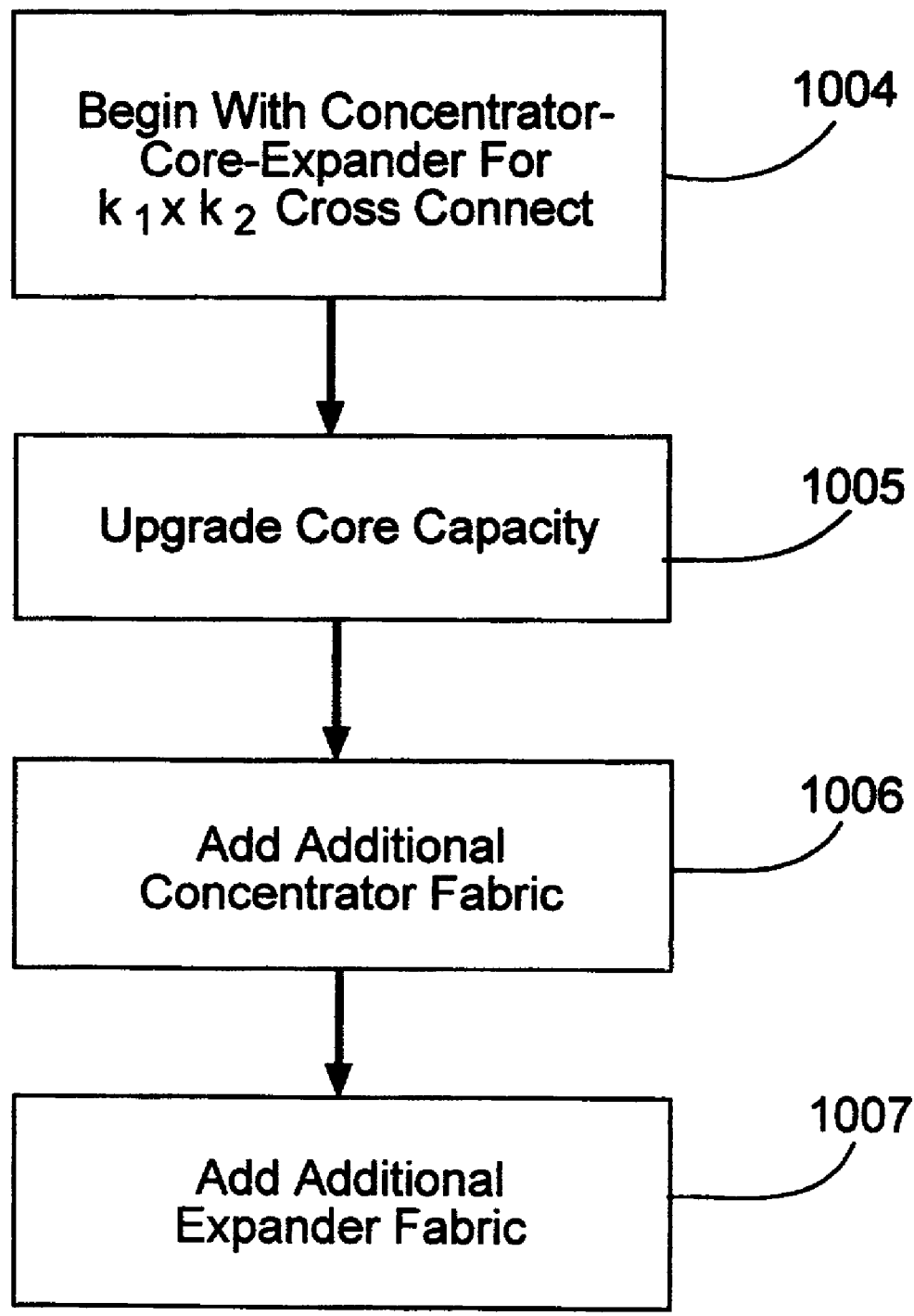
FIG. 10A is a flow diagram showing a method for upgrading a variable-density cross connect in accordance with an embodiment of the invention.

The first type of upgrade is an example that maintains the variable-density character of the architecture. The general method for performing such upgrades is shown with the flow diagram of FIG. 10A. The method begins at block 1004 with a variable-density cross connect having a concentrator, a core, and an expander. At block 1005, an upgrade is performed to increase the capacity of the core. An example is provided below in the discussion with respect to FIGS. 11A–11G how such an upgrade may be performed as an in-service upgrade without disrupting existing traffic. At block 1006, additional concentrator fabric is added and, at block 1007, additional expander fabric is added so that the new inputs and/or outputs of the core cross connect may be placed in optical communication with the additional concentrator and/or expander fabric. The specific order of the blocks in FIG. 10A is for illustrative purposes only. In other embodiments, the upgrade may be performed in a different order. For example, the additional expander fabric at block 1007 could be added before the additional concentrator fabric is added at block 1006. In other embodiments, the additional expander fabric and/or the additional concentrator fabric could be added before the core capacity is upgraded at block 1005.

Figure 10B:
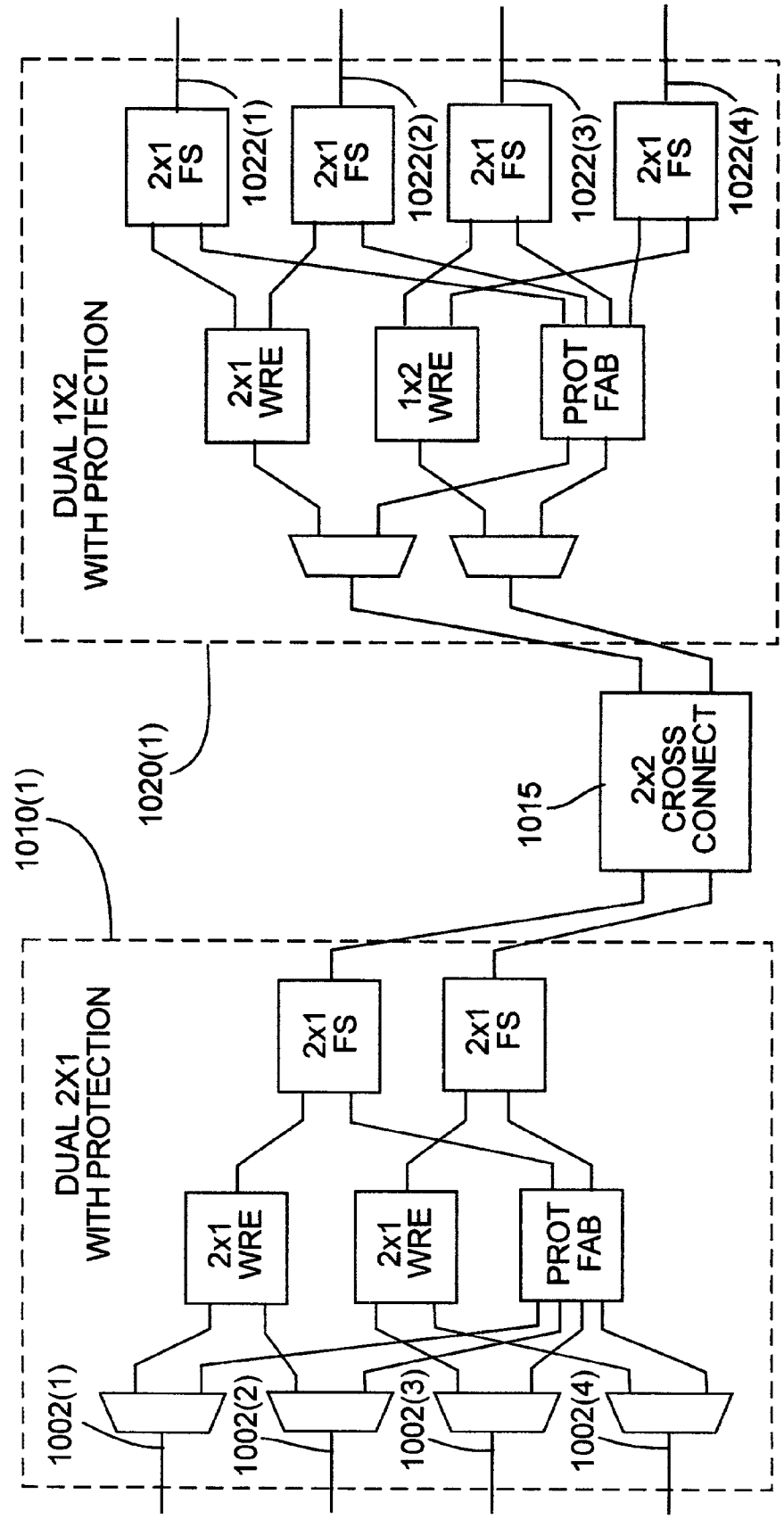
FIGS. 10B–10D provide schematic illustrations of a variable-density cross connect in stages of an upgrade performed according to the method shown in FIG. 10A.
Figure 10C:
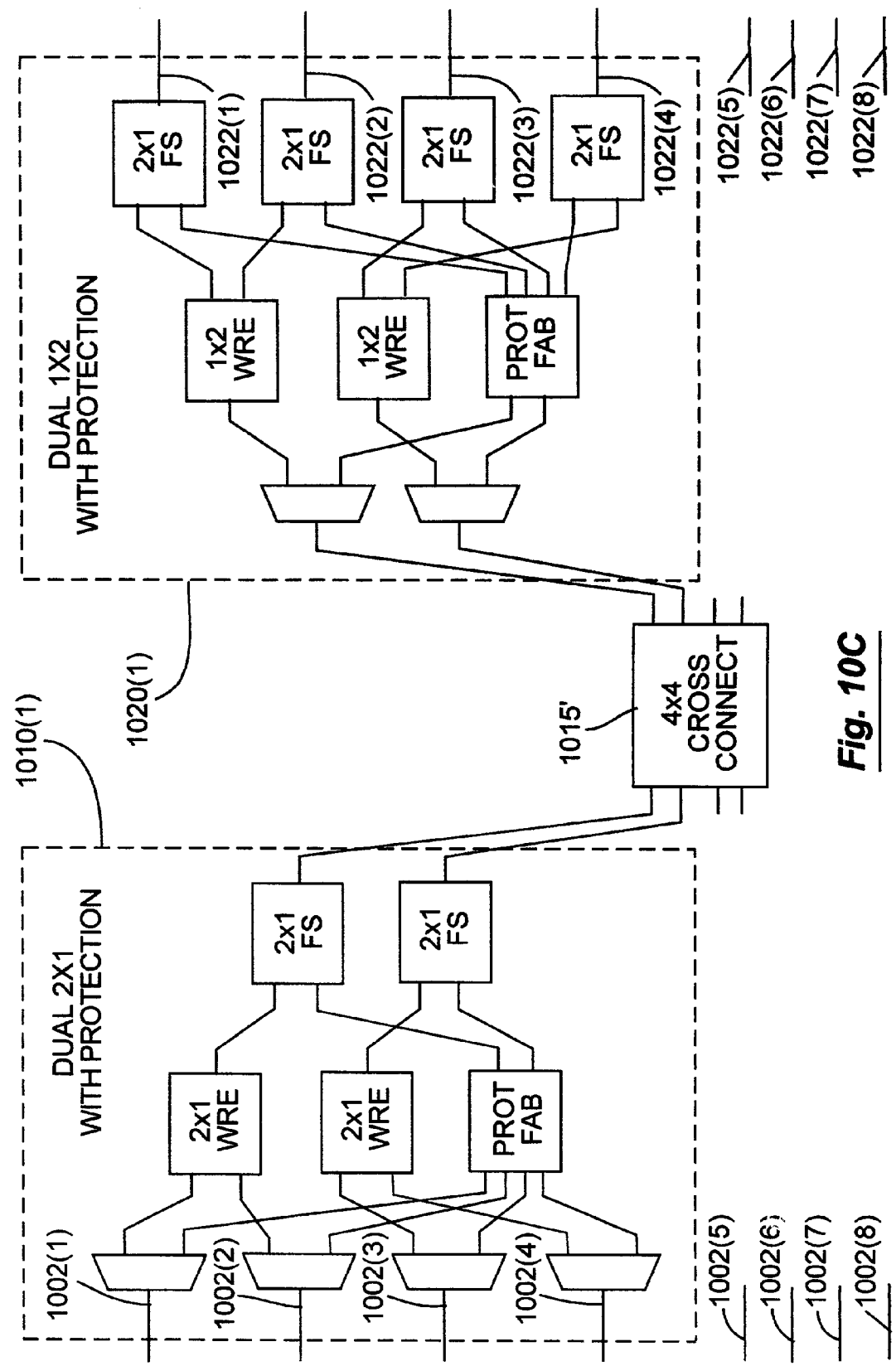
Figure 10D:
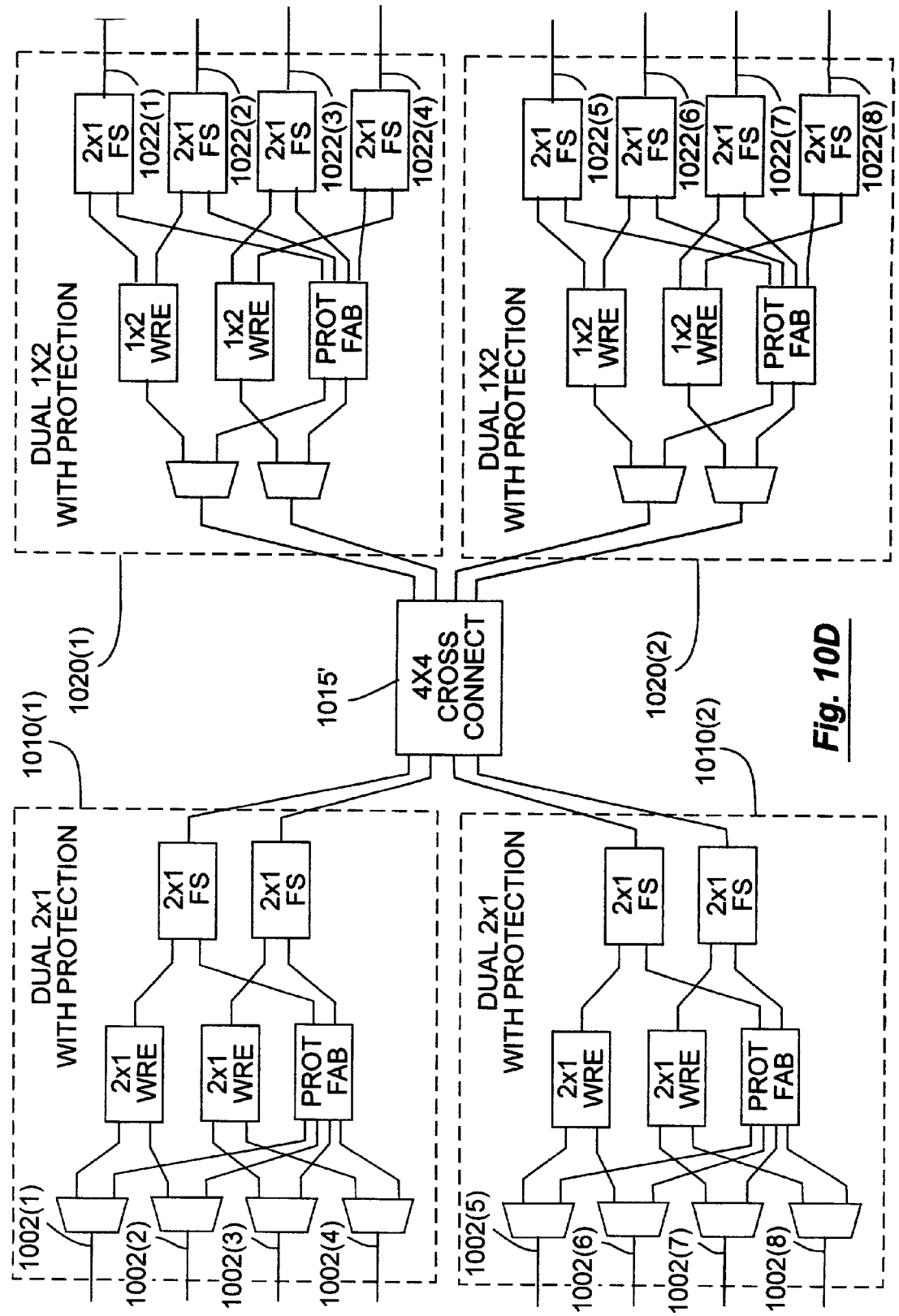

The method as outlined with respect to FIG. 10A is demonstrated in FIGS. 10B–10D with the specific example of a 4×4 variable-density cross connect with a concentration factor C equal to two so that the core cross connect is a full-capacity 2×2 cross connect. The initial variable-density cross-connect structure is shown schematically in FIG. 10B. Spectral bands from input optical signals 1002 are directed to any of the desired output optical signals 1022 by propagation through a concentrator 1010(1), a core cross connect 1015, and an expander 1020(1). The concentrator 1010(1) is configured as a dual 2×1 cross connect with protection and has the same structure described previously with respect to FIG. 8A. The expander 1020(1) is configured as a dual 1×2 cross connect with protection and has the same structure described previously with respect to FIG. 8B.

FIG. 10C shows the change in architecture that results from upgrading the core cross connect in accordance with block 1005 of FIG. 10A, in this example from a 2×2 cross connect 1015 to a 4×4 cross connect 1015'. The upgraded core cross connect 1015' has unused ports that may be put in optical communication with additional concentrator and expander fabric in accordance with blocks 1006 and 1007 of FIG. 10A. In one embodiment, such additional concentrator and expander fabric may be distinct from the existing concentrator and expander fabric. Such an embodiment is illustrated with FIG. 10D in which the additional concentrator fabric 1010(2) comprises a second dual 2×1 cross connect with protection and the additional expander fabric 1020(2) comprises a second dual 1×2 cross connect with protection. The upgraded cross connect shown in FIG. 10D is thus an 8×8 variable-density cross connect with concentration factor C equal to two.

In other embodiments, the additional concentrator and expander fabric may be added to and integrated with the existing concentrator and expander fabric. This may be accomplished by upgrading those individual fabrics separately to add the new optical-signal capacity so that, in one embodiment, they continue to share a protection fabric. Such an upgrade may proceed by progressively using the protection fabric to bypass one of the working-fabric WREs and upgrading that WRE. This general method is illustrated schematically with the flow diagram in FIG. 11A.

At block 1101, the method begins with a protected architecture, which may correspond to the concentrator or expander. Additional working fabric for new input and output ports is added at block 1102 and the protection fabric is upgraded to the larger size at block 1103. At block 1104, transmission is passed from one of the working fabrics to the protection fabric so that the bypassed working fabric may be upgraded at block 1105. After upgrading the bypassed working fabric, transmission is switched back to the upgraded working fabric at block 1106. If not all of the working fabric has been upgraded, as checked at block 1107, the process is repeated with the next working fabric at block 1108.

Figure 11A:
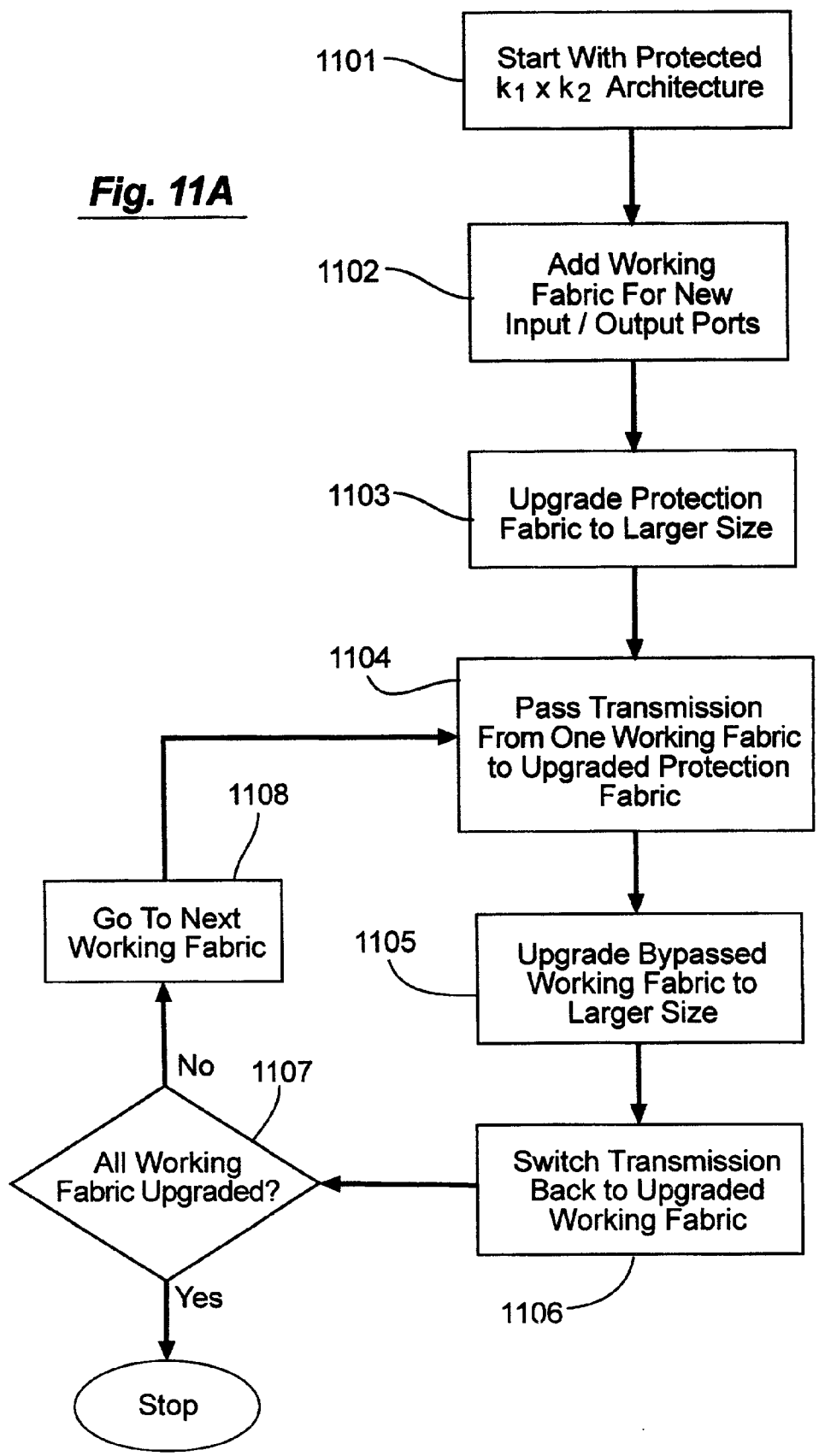
FIG. 11A is a flow diagram showing a method for upgrading a protected component cross connect of a variable-density cross connect in accordance with an embodiment of the invention.

It will be appreciated that while FIG. 11A illustrates an embodiment in which the protection fabric is upgraded before the working fabric is upgraded, such an order is not necessary. More generally, the upgrade of the protection fabric may be performed at any point in the method, i.e. before, after, or even during intermediate stages in the upgrade of the working fabric. With respect to the flow diagram of FIG. 11A, the position of blocks 1102 and 1103 may thus be moved freely within the method without exceeding the scope of the invention.

Figure 11B:
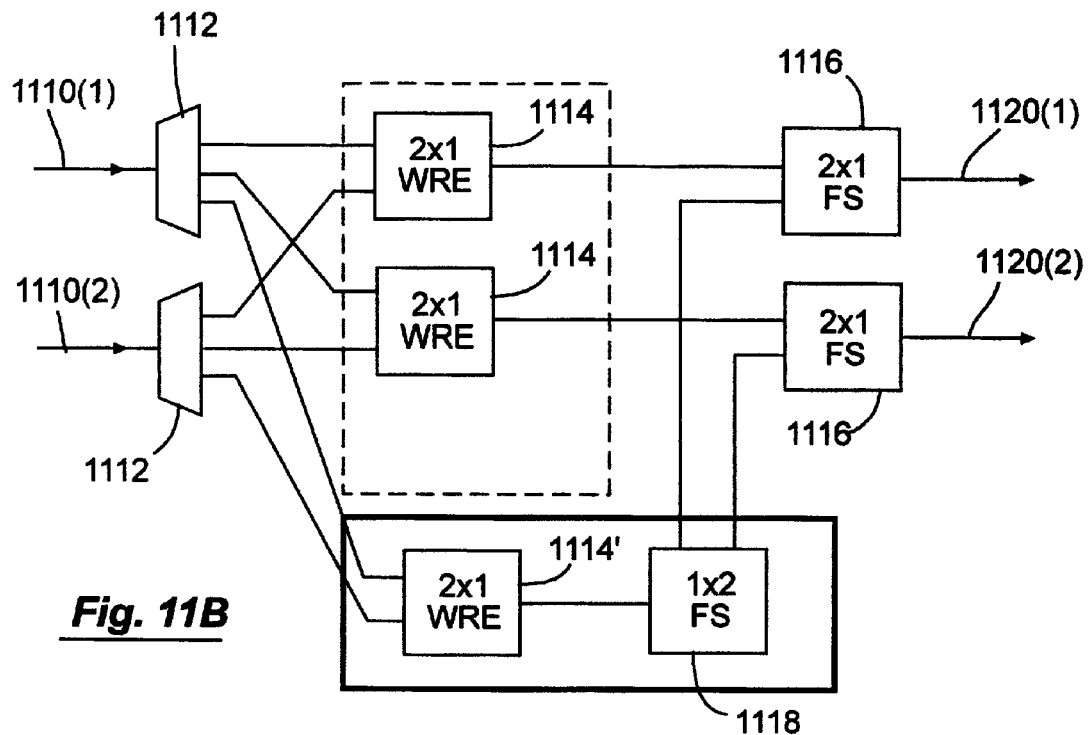
FIGS. 11B–11G provide schematic illustrations of a protected component cross connect in stages of an upgrade performed according to the method shown in FIG. 11A.

The method outlined with respect to FIG. 11A is generically applicable to in-service upgrades of protected architectures and may therefore equally be used for upgrading the core cross connect when it has a protection fabric. A specific example illustrating an in-service upgrade of a cross-connect component is thus shown in FIGS. 11B–G for upgrading the 2×2 core cross connect 1015 when it is embodied with a broadcast-and-select configuration. FIG. 11B shows the initial protected 2×2 broadcast-and-select architecture for routing spectral bands from first intermediate optical signals 1110 received from the concentrator onto second intermediate optical signals 1120 for transmission to the expander. Optical couplers 1112 are used to transmit equivalents to the first intermediate optical signals 1110 to working-fabric 2×1 WREs 1114 and to a protection-fabric 2×1 WRE 1114'. Fiber switches 1116 and protection fiber switch 1118 are used to route traffic onto the protection fabric as necessary or desired.

Figure 11C:
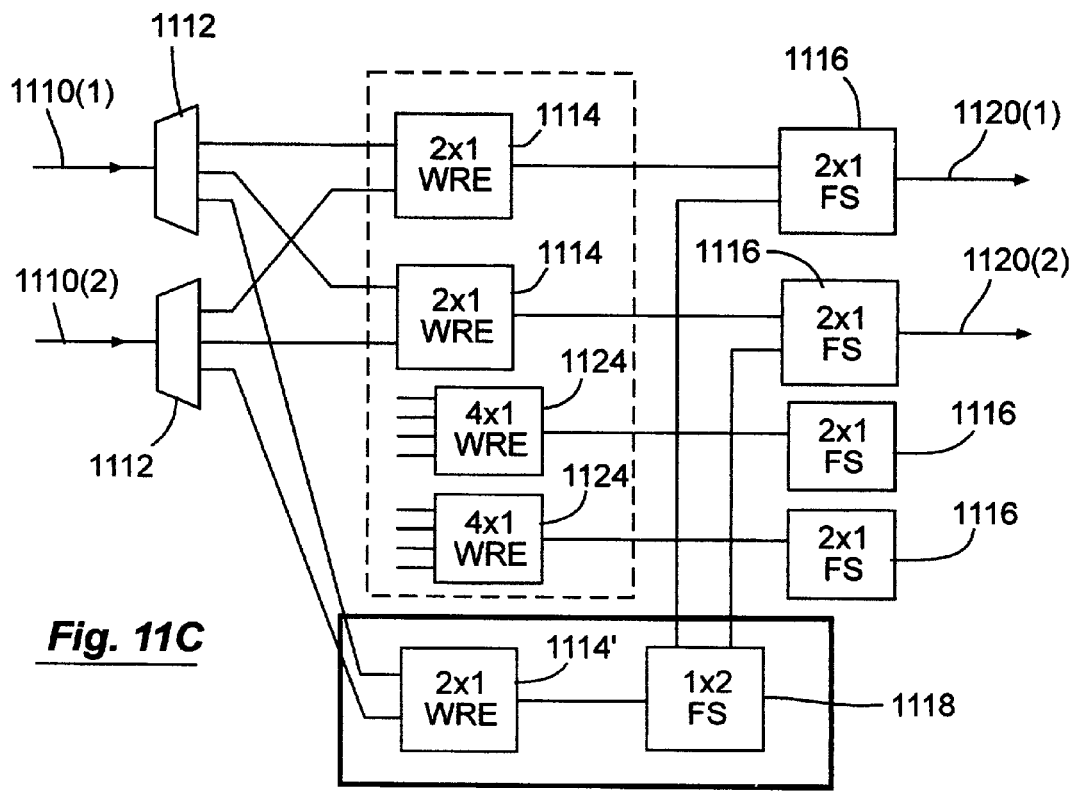
Figure 11D:
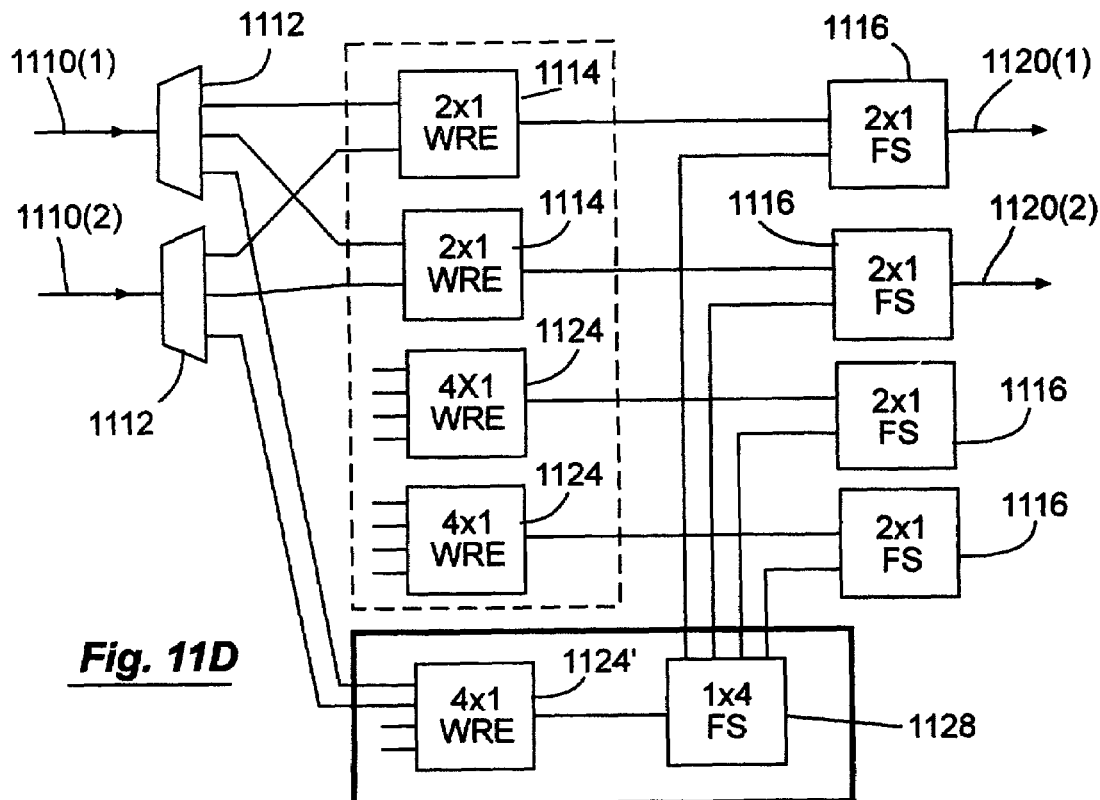

The result of adding new working fabric for the new output ports in accordance with block 1102 of FIG. 11A is shown in FIG. 11C. Here, new 4×1 WREs 1124 have been added to the working fabric in optical communication with additional 2×1 fiber switches 1116 that will be used to select between working and protection signals after the upgrade is complete. Since the existing traffic is being propagated on the working channels, it need not be interrupted when the protection fabric is upgraded in accordance with block 1103 of FIG. 11A to produce the intermediate architecture shown in FIG. 11D. The 2×1 WRE 1114' and 1×2 fiber switch 1118 have been substituted with a larger-capacity 4×1 WRE 1124' and 1×4 fiber switch 1128. The additional connections to the 1×4 fiber switch 1128 are connected to the newly added 2×1 fiber switches 1116.

Figure 11E:
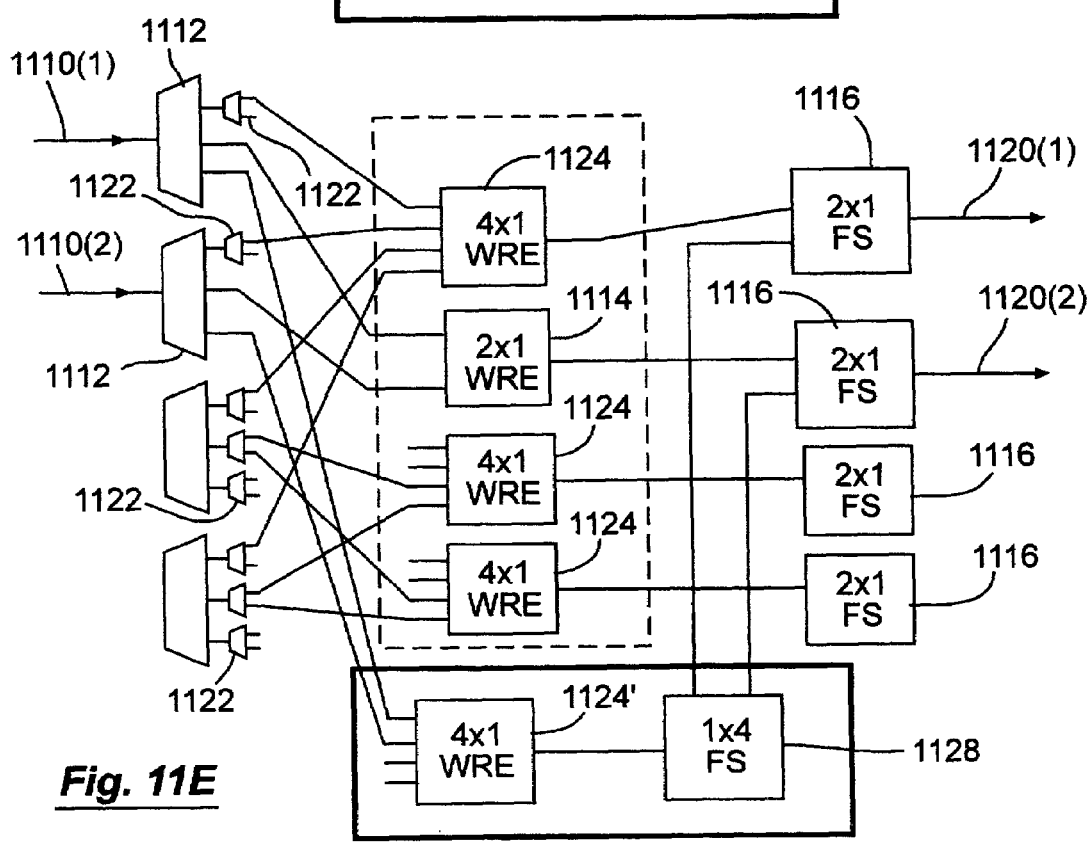

FIG. 11E shows the result of upgrading the first component of the working fabric in accordance with block 1105 of FIG. 11A, after that component has been bypassed in accordance with block 1104 of FIG. 11A by rerouting traffic to the protection fabric. The upgrade of the working fabric includes replacing the bypassed 2×1 WRE 1114 with a 4×1 WRE 1124. In addition, FIG. 11 illustrates how the operation of the optical couplers may be extended by adding 1:2 optical couplers 1122 as necessary at the output of the existing optical couplers. Such 1:2 optical couplers 1122 are added at points in the process when those outputs are not actively in use. Thus, in FIG. 11E optical couplers 1122 are added to the first outputs of the original 1:3 optical couplers 1112 while the traffic for the first input signal 1110(1) is routed to the protection fabric. Optical connections are also made between the upgraded working WRE 1124 and the (new) first outputs of the effectively expanded optical couplers. Optical couplers to be configured for encountering the new traffic may be similarly configured as a combination of 1:3 and 1:2 optical couplers as shown, or may alternatively be substituted with 1:5 optical couplers.

Figure 11F:
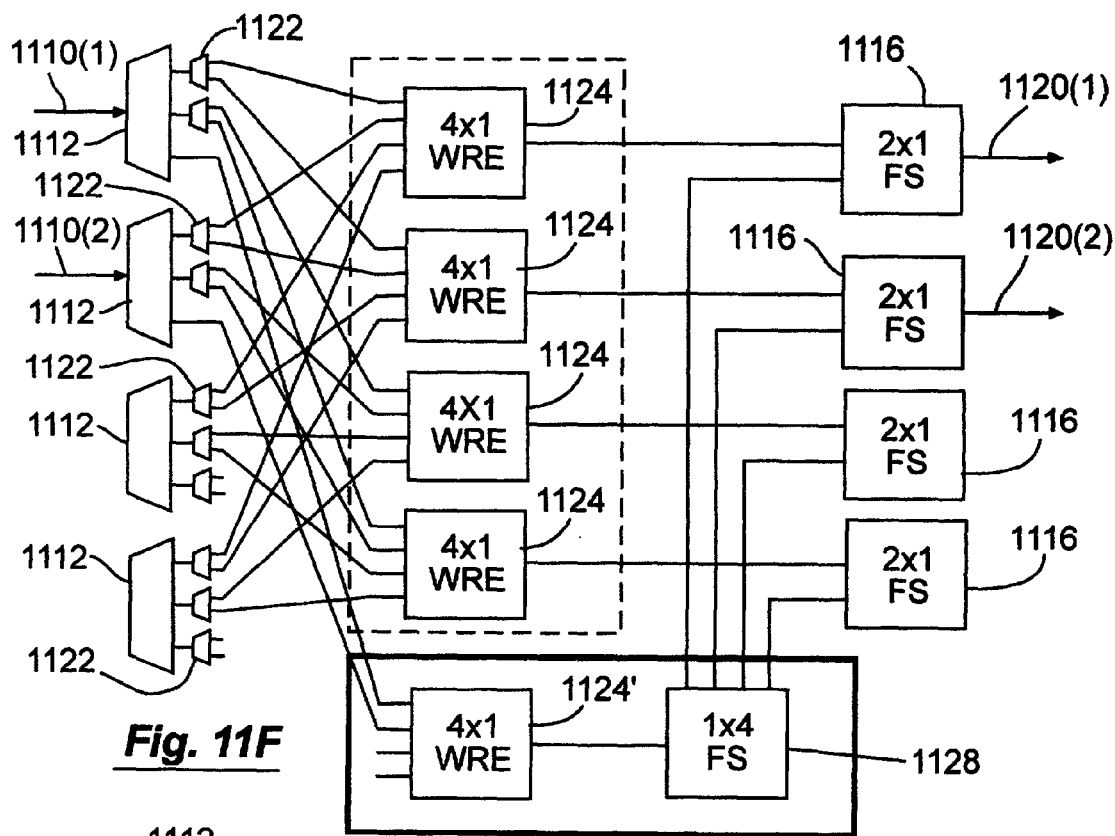
Figure 11G:
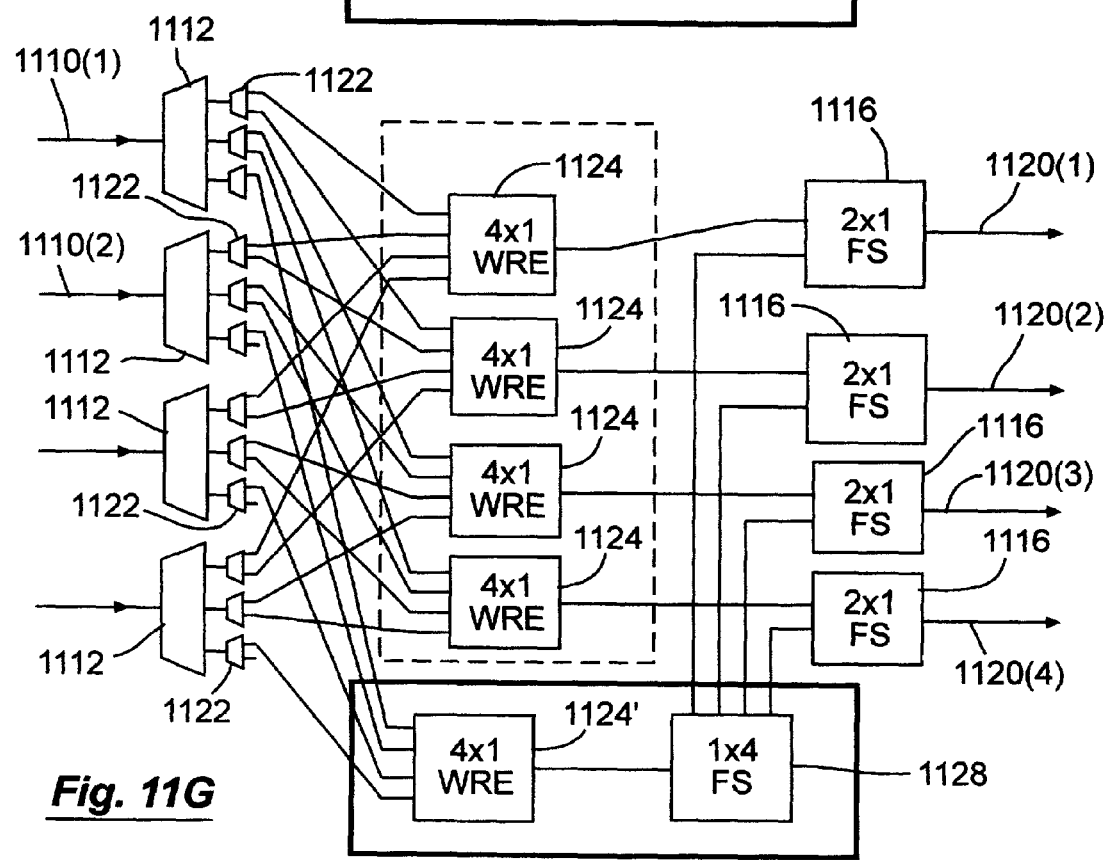

FIG. 11F shows a further intermediate illustration of the cross connect when the traffic for the second input signal 1110(2) is bypassed. This stage thus corresponds again to block 1105 of FIG. 11A, but after blocks 1106, 1107, 1108, and 1104 have been performed as part of the loop to upgrade each of the working fabrics sequentially. At this stage, a similar upgrade has been performed, with the second 2×1 WRE 814 of the working fabric being replaced with a 4×1 WRE 1124 while the traffic is bypassed. In addition, 1:2 optical splitters 1122 are added to the second outputs of the 1:3 optical splitters 1112 and put in optical communication with the new 4×1 WRE 1124. After all the working fabric has been upgraded, additional optical signals 1110(3) and 1110(4) may be provided to, and additional output signals 1120(3) and 1120(4) emitted from, the cross connect as shown in FIG. 11G.

As previously noted, the same method illustrated in detail for a specific embodiment in FIGS. 11B–11G may be applied to upgrade any of the concentrator, core, and expander components of the variable-density optical cross connect. Embodiments in which the concentrator and/or expander are upgraded, rather than supplemented directly with new concentrators and/or expanders as shown in FIG. 10D, additionally permit upgrades to be performed in which the concentration factor C is varied. This may be done without affecting the number of input and/or output signals accommodated by the variable-density cross-connect structure.

For example, consider the case of a symmetric K×K variable-density cross connect that comprises a symmetric $m_1 \times m_1$ full-capacity core cross connect. The concentrator is configured as a $K \times m_1$ element and the expander as an $m_1 \times K$ element, so that the concentration factor is $C_1 = K/m_1$. If growth in traffic has made it desirable to use more channels on the input and output optical signals, the change may be accommodated by decreasing the concentration factor to $C_2$. Such a decrease in concentration factor is achieved by performing upgrades of the concentrator, core, and expander respectively to $K \times m_2$, $m_2 \times m_2$, and $m_2 \times K$ elements, where $m_2 \geq (C_1/C_2)m_1$. Each of the upgrades of the concentrator, core, and expander may be performed as an in-service upgrade according to the method summarized in FIG. 11.

To illustrate the method of changing the concentration factor for a specific variable-density cross connect, consider the case of an 8×8 cross connect having a concentration factor $C_1 = 4$. Such an architecture may be suitable where, say, only 20 channels of an 80-channel structure are used. The concentrator comprised by the architecture may be an 8×2 element, the core may be a 2×2 element, and the expander may be a 2×8 element. If it becomes desirable to use more of the channels, say 25 channels, this may be accommodated with a concentration factor of $C_2 = 3$ so that the concentrator is upgraded to an 8×3 element, the core is upgraded to a 3×3 element, and the expander is upgraded to a 3×8 element. Similarly, if it becomes desirable to use an even greater number of channels, say 35 channels, this may be accommodated with a concentration factor of $C_3 = 2$ so that the concentrator is upgraded to an 8×4 element, the core is upgraded to a 4×4 element, and the expander is upgraded to a 4×8 element.

4.4.2 Upgrades to Full-Capacity Cross-Connect Architectures

To continue with the previous example, continued growth may eventually make it desirable to use more than half the available channels, perhaps even to use all the available channels. In such cases, it may therefore be desirable to upgrade the variable-density cross connect fully into a full-capacity cross connect while maintaining the same number of input and/or output signals that may be accommodated. A method for performing such an upgrade is illustrated with the flow diagram of FIG. 12A. The implementation of the method is illustrated for the specific case of upgrading a 4×4 variable-density cross connect to a full-capacity 4×4 broadcast-and-select cross connect with FIGS. 12B–12H. For convenience, therefore, the following description of one embodiment for performing the upgrade is made with simultaneous reference to FIG. 12A and portions of FIGS. 12B–12H.

Figure 12A:
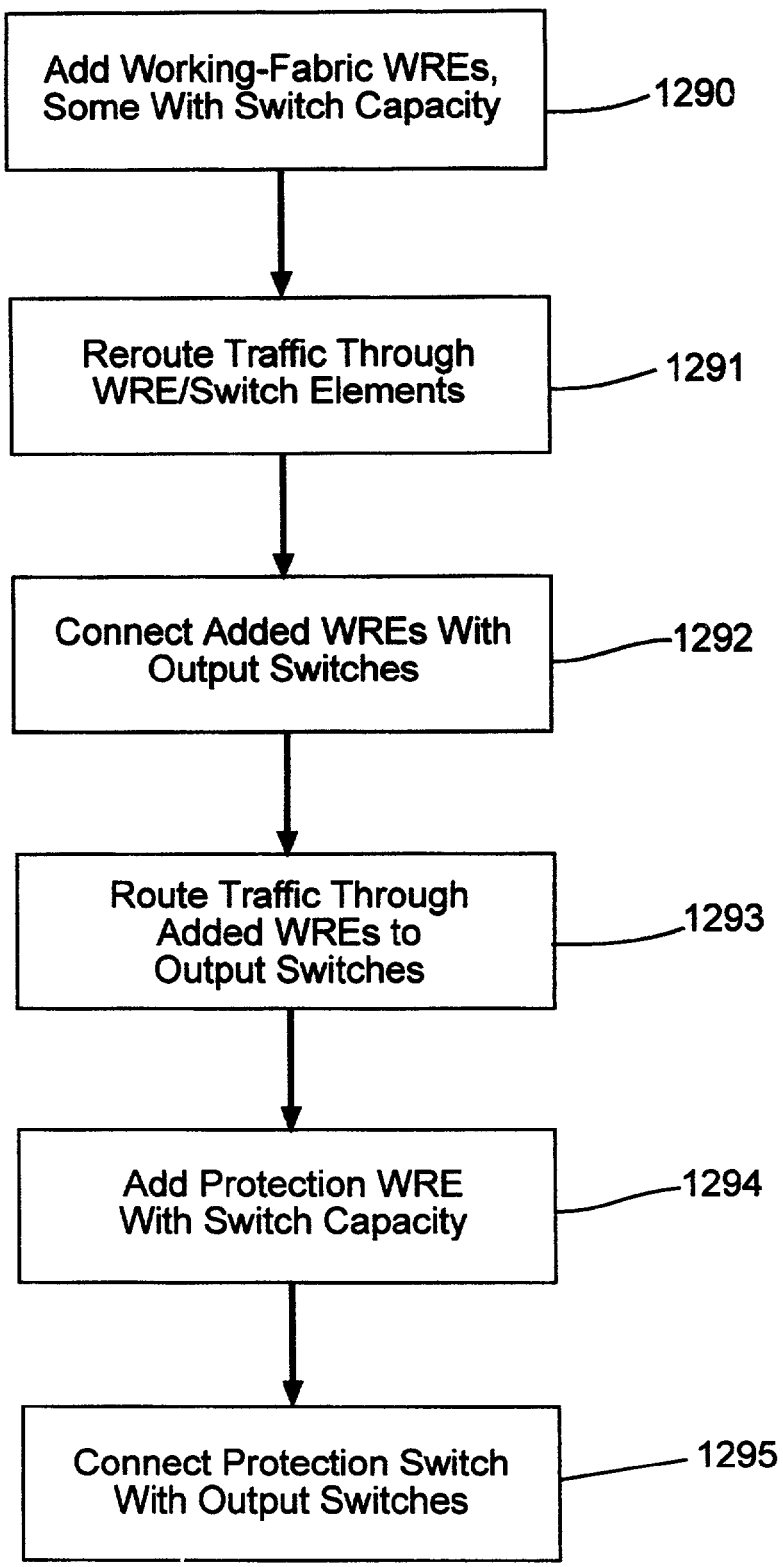
FIG. 12A is a flow diagram showing a method for upgrading a variable-density cross connect to a full-capacity cross connect according to an embodiment of the invention.
Figure 12B:
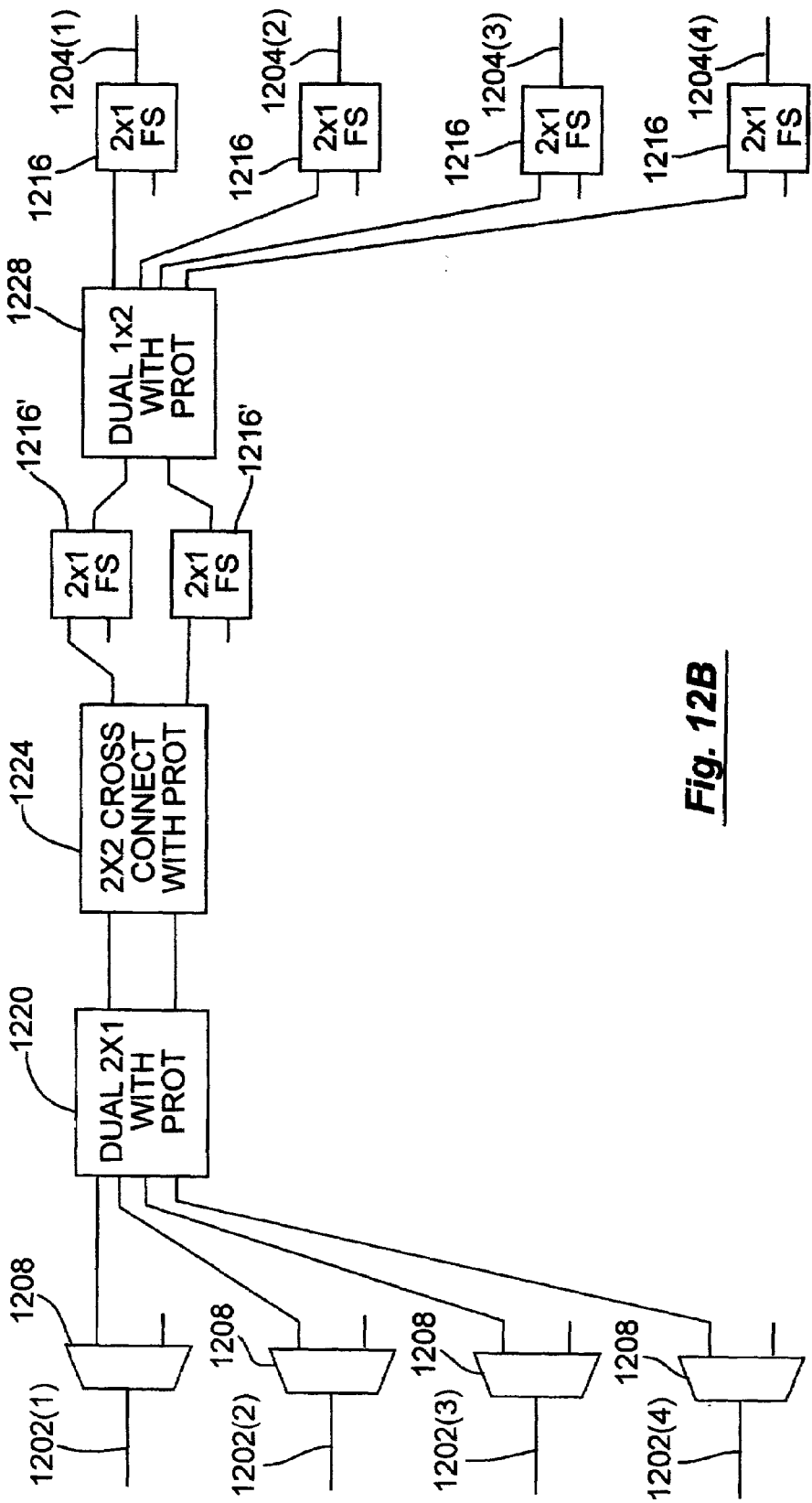
FIGS. 12B–12H provide schematic illustrations of a cross connect in stages of an upgrade from a variable-density configuration to a broadcast-and-select configuration in accordance with an embodiment.

FIG. 12B shows an initial configuration of the 4×4 variable-density cross connect for routing spectral bands from input signals 1202 onto output signals 1204. The architecture includes a concentrator 1220 provided as a dual 2×1 cross connect with protection, a core 1224 provided as a full-capacity 2×2 cross connect with protection, and an expander 1228 provided as a dual 1×2 cross connect with protection. In one embodiment, the core 1224 comprises a broadcast-and-select cross connect, although this is not necessary and it may comprise any full-capacity cross connect, including those disclosed in the copending architecture applications. In addition, as mentioned in connection with FIG. 7B, the variable-density cross connect includes optical combiners 1208 and fiber switches 1216 and 1216'. As shown in FIG. 12B, each of these has unused ports so that they do not have any operational effect on the architecture. They are advantageously included, however, because they facilitate the upgrade to a full-service cross connect as described below. Also, the optical couplers 1208 and 2×1 fiber switches 1216 correspond to those structures to be used in the upgraded full-service cross connect respectively for receiving the input signals 1202 and transmitting the output signals 1204.

Figure 12C:
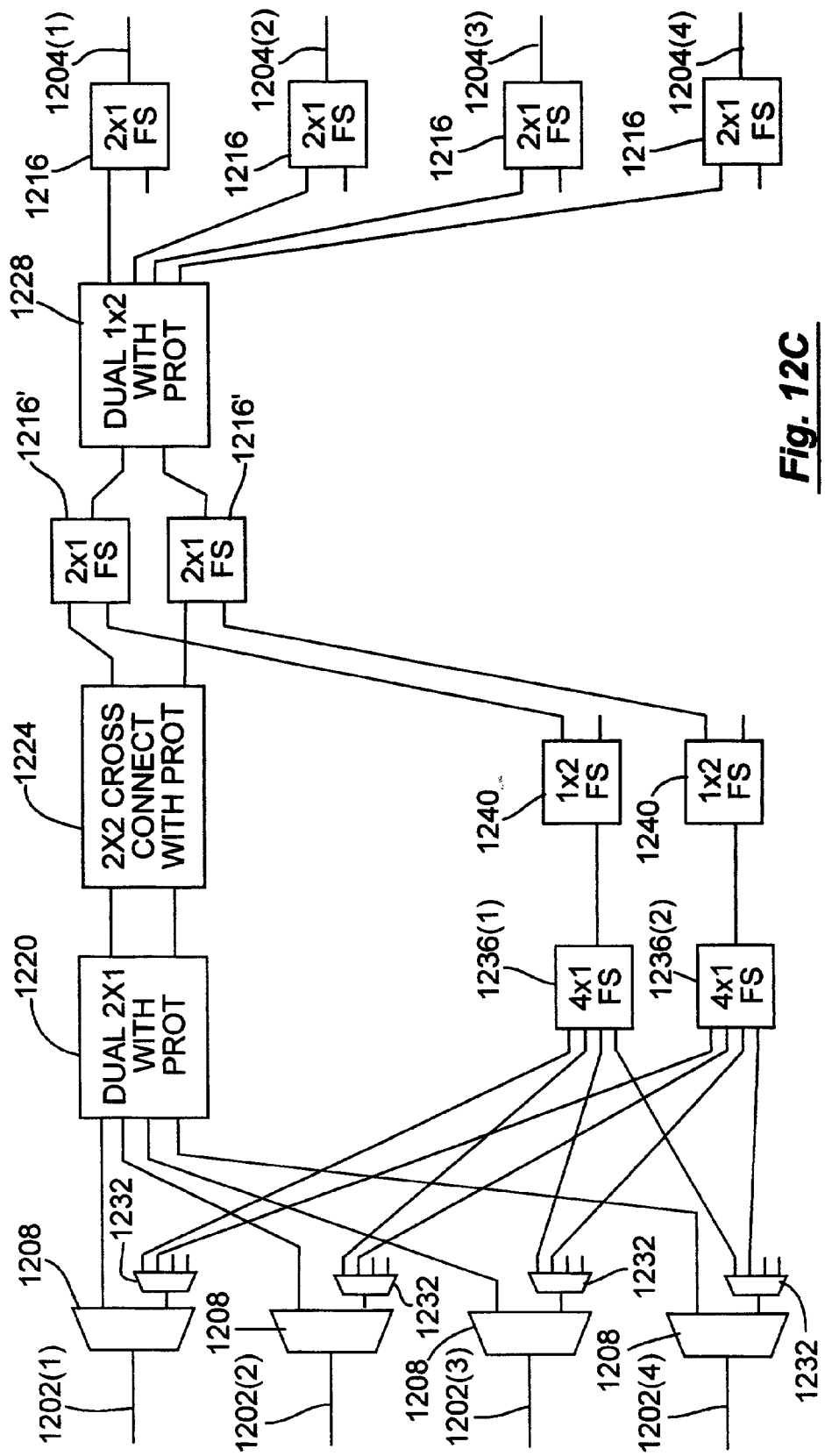
Figure 12D:
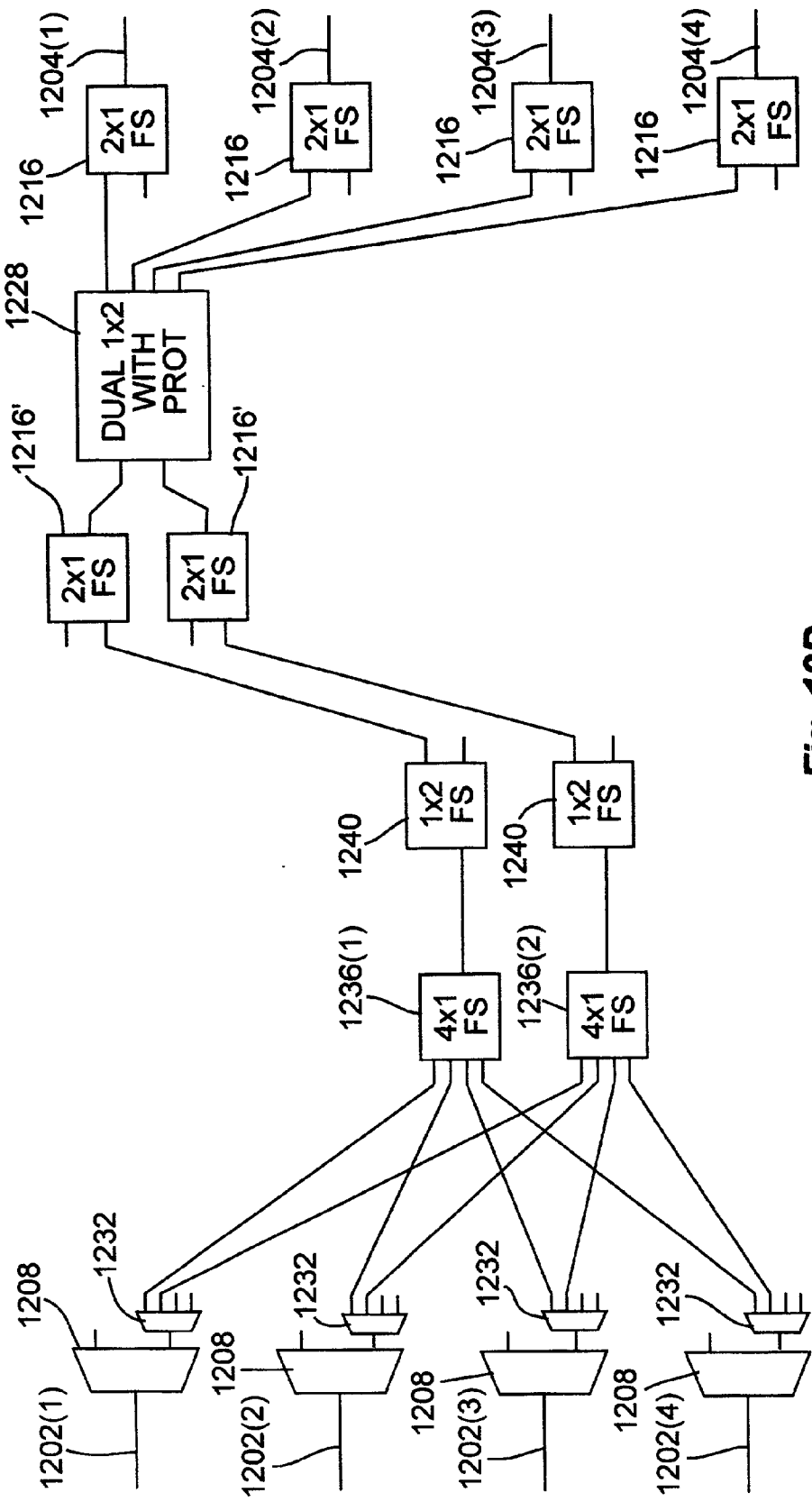

At block 1290 of FIG. 12A, working-fabric WREs are added to the architecture. Some of these are first shown in FIG. 12C and others are first shown in FIG. 12E. The added WREs 1236(1) shown in FIG. 12C comprise 4×1 WREs since that is an appropriate size for the working-fabric WREs to be included in the upgraded full-capacity cross connect. The two WREs 1236 added in FIG. 12C are additionally configured to be in optical communication with 1×2 fiber switches 1240 so that switching capacity is provided to the added WREs 1236. In addition, the capacity of the optical couplers 1208 is increased by adding further couplers 1232 to the unused ports. For the exemplary 4×4 cross connect, the coupler capacity is increased to permit at least five equivalents to each input optical signal 1202 to be provide, four for propagation to the working fabric and one for propagation to the protection fabric. The inputs of the added 4×1 WREs 1236 are placed in optical communication with each of the coupler arrangements and one of the outputs of each added 1×2 fiber switch 1240 is placed in optical communication with one of the 2×1 fiber switches between the core 1224 and expander 1228 elements.

One effect of the added optical arrangements is that optical paths are now provided for routing equivalents to the input optical signals 1202 through the added working fabric and bypassing the concentrator 1220 and core 1224 elements. The functionality of the added WREs 1236 is at least sufficient to reproduce the functionality of the bypassed elements, so traffic is accordingly rerouted through those elements at block 1291. While the traffic is rerouted, the bypassed concentrator 1220 and core 1224 elements are removed from the architecture to produce the intermediate structure shown in FIG. 12D.

Figure 12E:
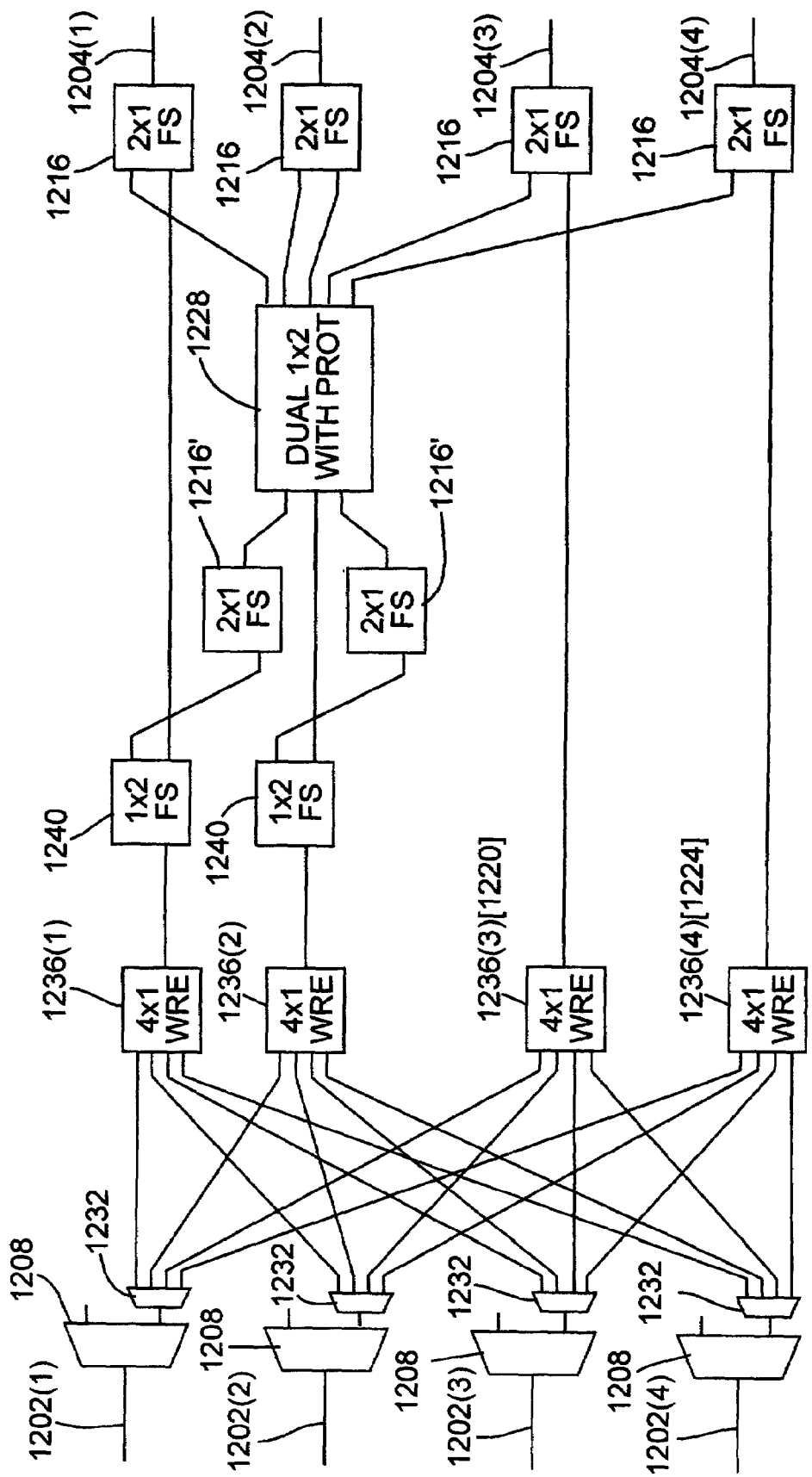
Figure 12F:
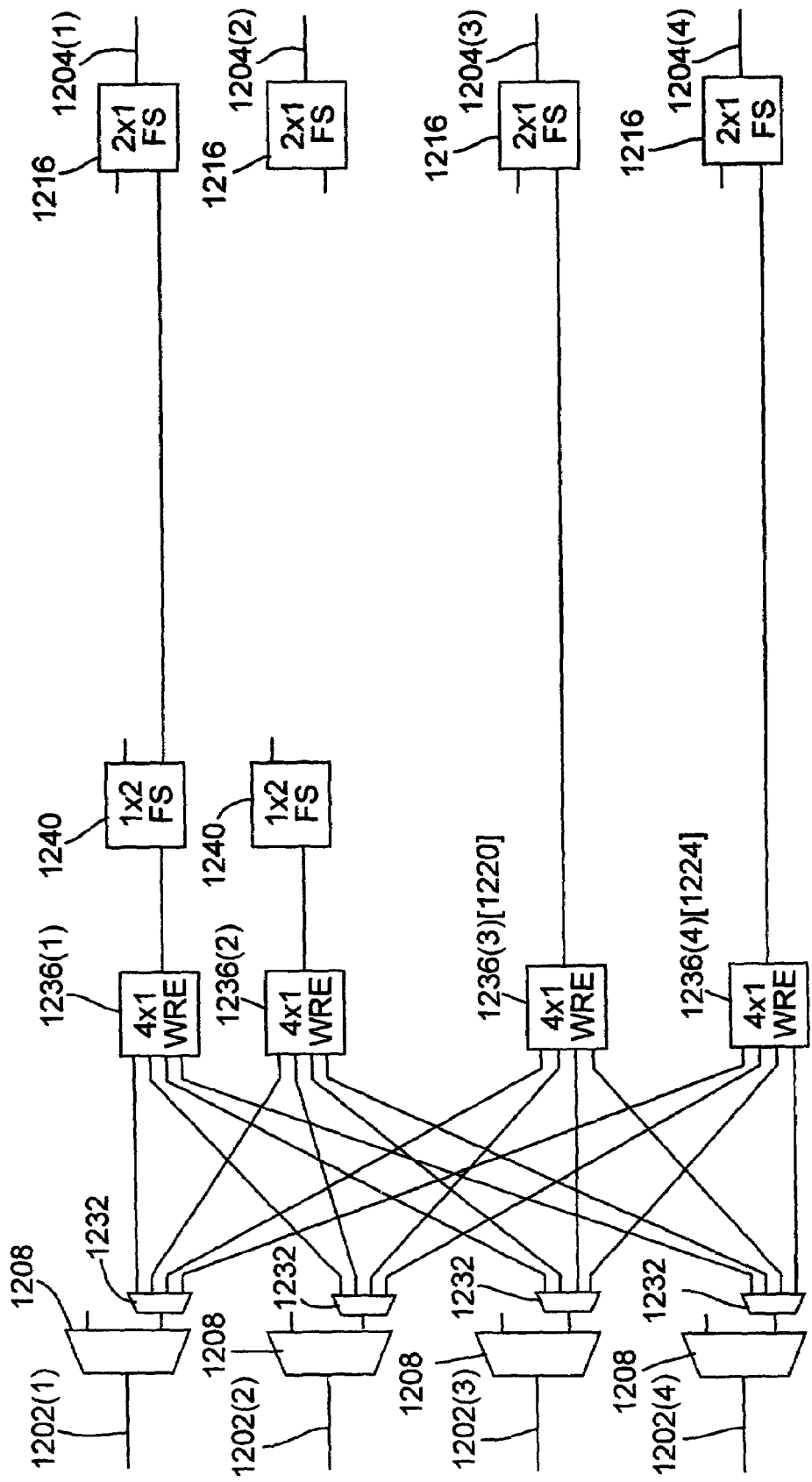
Figure 12G:
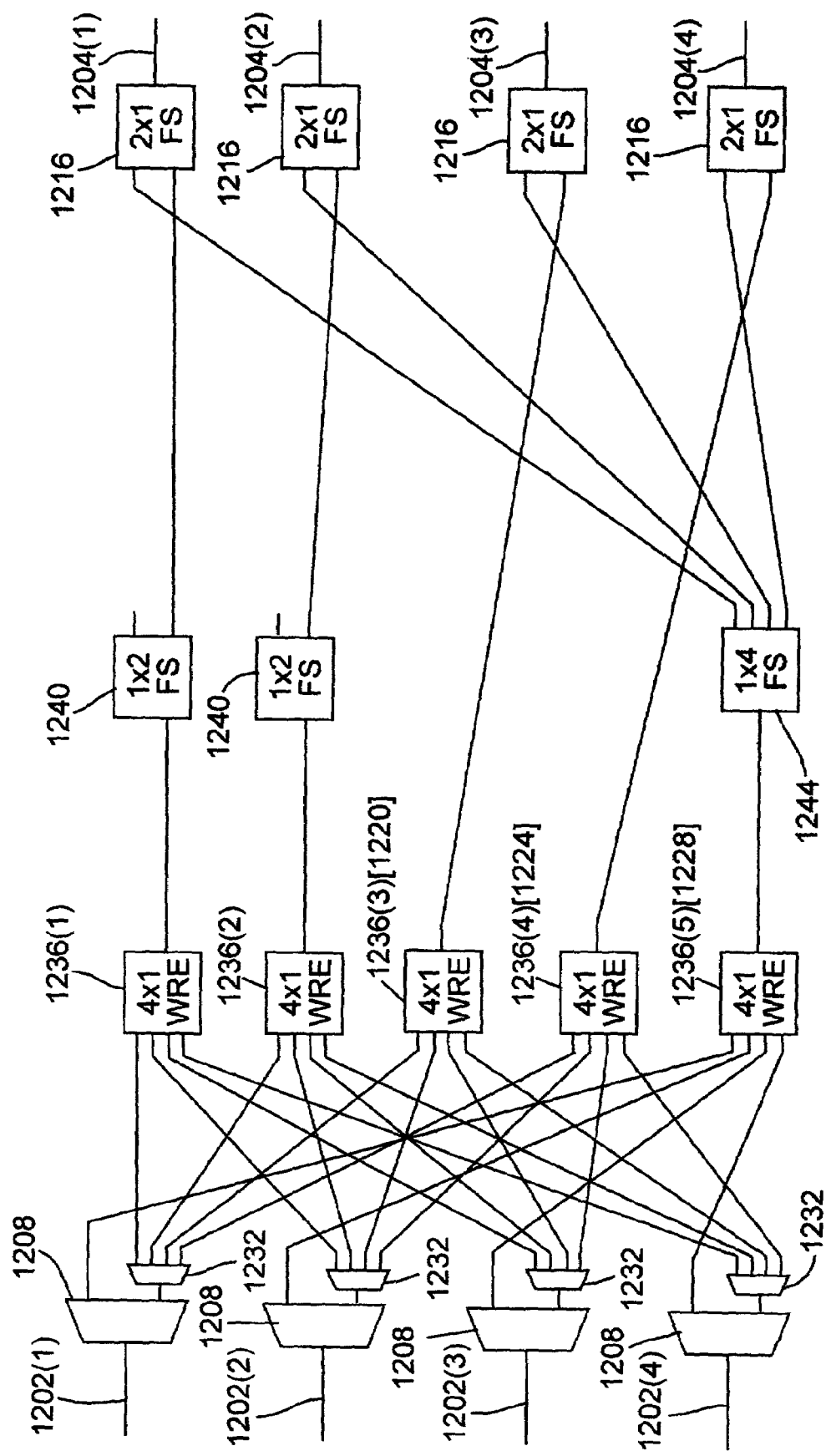

FIG. 12E shows the result of adding the remaining working-fabric WREs 1236 in accordance with block 1290 of FIG. 11A. These WREs 1236(3) and 1236(4) may be provided without the switching capability provided by the 1×2 fiber switches 1240 included with the previously added WREs 1236(1) and 1236(2). While it is possible that all of the WREs 1236 could have been added at the same time, adding them separately in this manner permits the removed concentrator 1220 and core 1224 elements to be restructured as 4×1 WREs and reused. To emphasize this possibility in one embodiment, FIG. 12E denotes in square brackets that restructured concentrator 1220 may be used as 4×1 WRE 1236(3) and restructured core 1224 may be used as 4×1 WRE 1236(4). Also shown in FIG. 12E are optical connections established in accordance with block 1292. In particular, each of the added WREs 1236 is placed in optical communication with the preexisting 2×1 fiber switches 1216. In the case of WREs 1236(1) and 1236(2), such optical communication is provided through the corresponding 1×2 fiber switches 1240. In the case of WREs 1236(3) and 1236(4), such optical communication may be provided directly between the WRE and the fiber switch 1216. It is, of course, possible that optical communication between elements be provided through additional intermediate elements.

In addition, FIG. 12E shows that all of the working-fabric 4×1 WREs 1236 may be placed in optical communication with the coupler arrangements, permitting them to receive equivalents to each of the input optical signals 1202. The architecture shown in FIG. 12E may thus be used as a broadcast-and-select architecture in accordance with the routing prescribed at block 1293 of FIG. 12A. Spectral bands from the input signals 1202 are broadcast to each of the working-fabric WREs 1236. The configuration of each of the WREs 1236 determines which spectral bands are propagated to 2×1 fiber switches 1216 for transmission as output optical signals 1204.

While the arrangement of FIG. 12E thus functions as a broadcast-and-select architecture, it does so without a protection fabric. Also, it is evident that no traffic is routed through the expander element 1228 or through fiber switches 1216'. Accordingly, these elements are removed to produce the intermediate architecture shown in FIG. 12F, which also functions as an unprotected broadcast-and-select architecture. The protection capability for the architecture is added in accordance with block 1294 of FIG. 12A, such as by adding a protection-fabric WRE 1236(5) and fiber switch 1244. In one embodiment, the expander 1228 is restructured when it is removed to function as a 4×1 WRE, a possibility that is emphasized in the figure by identifying the protection-fabric WRE in square brackets with the expander reference numeral 1228. The protection fabric is integrated with the architecture by placing WRE 1236(5) in optical communication with each of the optical coupler arrangements and by placing fiber switch 1244 in optical communication with each of fiber switches 1216 in accordance with block 1295 of FIG. 12A.

Figure 12H:
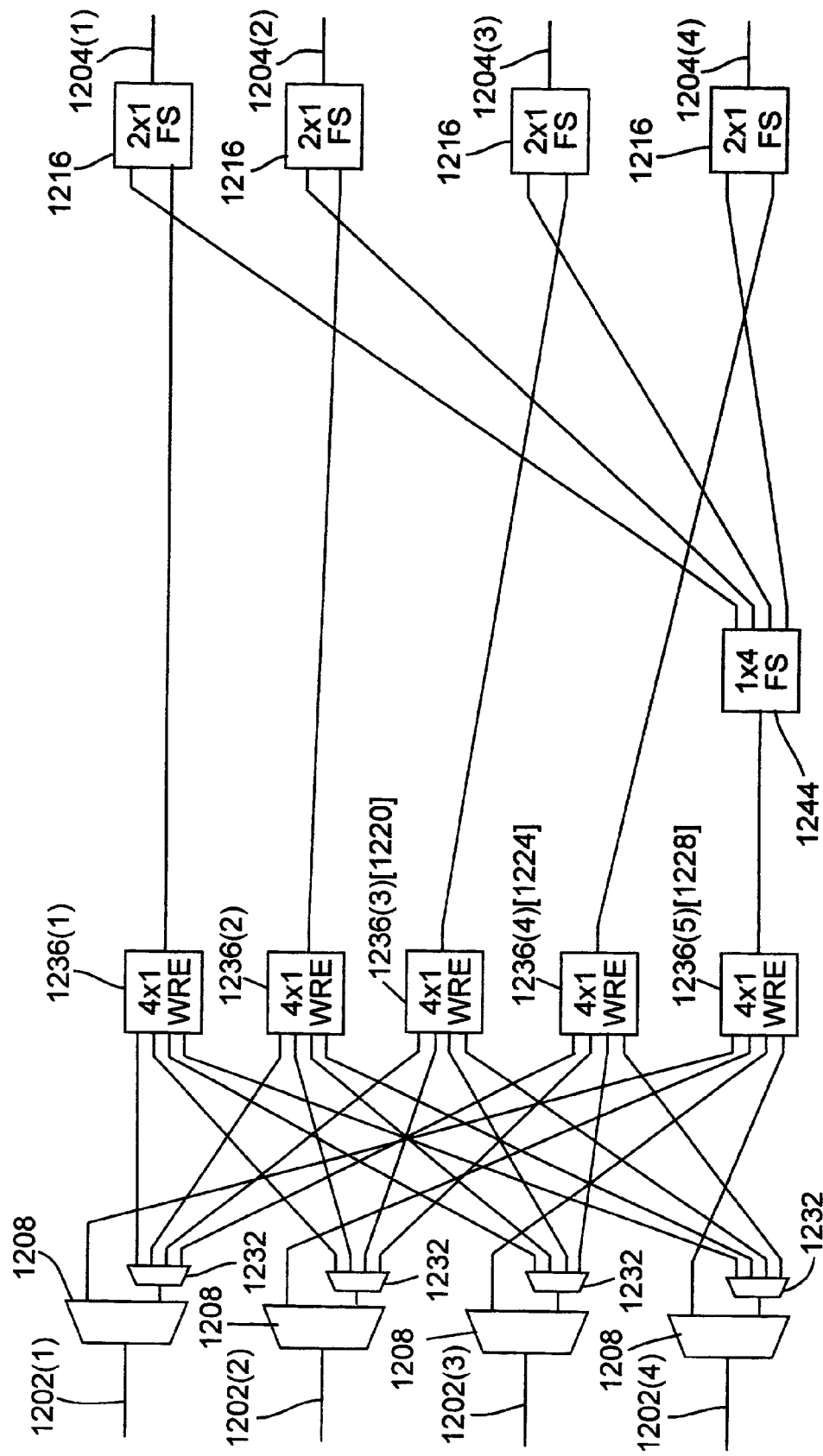

The protection capability of the architecture may now be used to reroute traffic sequentially from added WREs 1236(1) and 1236(2) so that fiber switches 1240 may be removed from the architecture. The result of such sequential rerouting and removal of fiber switches is shown in FIG. 12H as a fully upgraded broadcast-and-select architecture with protection. This upgraded architecture includes the desired full routing capacity.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. An optical cross connect for receiving a plurality of input optical signals each having a plurality of spectral bands and transmitting a plurality of output optical signals each having one or more of the spectral bands, the optical cross connect comprising:

a concentrator disposed to redistribute the spectral bands included on the plurality of input optical signals among a plurality of first intermediate optical signals, each of the input optical signals having a plurality of the spectral bands;

a core cross connect disposed to redistribute the spectral bands included on the plurality of first intermediate optical signals among a plurality of second intermediate optical signals; and an expander disposed to redistribute the spectral bands included on the plurality of second intermediate optical signals among the plurality of output optical signals, wherein the first intermediate optical signals are less in number than the input optical signals and the second intermediate optical signals are less in number than the output optical signals.

2. The optical cross connect recited in claim 1 wherein the first intermediate optical signals and the second intermediate optical signals are equal in number.

3. The optical cross connect recited in claim 1 wherein the input optical signals and the output optical signals are equal in number.

4. The optical cross connect recited in claim 1 wherein the concentrator comprises a plurality of wavelength routing elements, each such wavelength routing element being adapted for selectively routing wavelength components between a first WRE optical signal and a plurality of second WRE optical signals according to a configurable state of such wavelength routing element.

5. The optical cross connect recited in claim 4 wherein the first WRE optical signal for each wavelength routing element corresponds to one of the first intermediate optical signals.

6. The optical cross connect recited in claim 4 wherein each of the second WRE optical signals for each wavelength routing element corresponds to one of the input optical signals.

7. The optical cross connect recited in claim 4 wherein the concentrator further comprises a protection fabric adapted to maintain redistribution of the spectral bands included on the input optical signals among the first intermediate optical signals in the event of a failure of one of the wavelength routing elements.

8. The optical cross connect recited in claim 1 wherein the expander comprises a plurality of wavelength routing elements, each such wavelength routing element being adapted for selectively routing wavelength components between a first WRE optical signal and a plurality of second WRE optical signals according to a configurable state of such wavelength routing element.

9. The optical cross connect recited in claim 8 wherein the first WRE optical signal for each wavelength routing element corresponds to one of the second intermediate optical signals.

10. The optical cross connect recited in claim 8 wherein each of the second WRE optical signals for each wavelength routing element corresponds to one of the output optical signals.

11. The optical cross connect recited in claim 8 wherein the expander further comprises a protection fabric adapted to maintain redistribution of the spectral bands included on the second intermediate optical signals among the output optical signals in the event of a failure of one of the wavelength routing elements.

12. The optical cross connect recited in claim 1 wherein the core cross connect comprises a plurality of wavelength routing elements, each such wavelength routing element being adapted for selectively routing wavelength components between a first WRE optical signal and a plurality of second WRE optical signals according to a configurable state of such wavelength routing element.

13. The optical cross connect recited in claim 12 wherein equivalents to each of the first intermediate optical signals are directed to each of the plurality of wavelength routing elements as the plurality of second WRE optical signals.

14. The optical cross connect recited in claim 13 wherein the first WRE optical signal for each of the plurality of wavelength routing elements corresponds to one of the second intermediate optical signals.

15. The optical cross connect recited in claim 12 wherein the core cross connect further comprises a protection fabric adapted to maintain redistribution of the spectral bands included on the first intermediate optical signals among the second intermediate optical signals in the event of a failure of one of the wavelength routing elements.

16. A method for distributing a plurality of spectral bands comprised by a plurality of input optical signals each having a plurality of the spectral bands onto a plurality of output optical signals, the method comprising:
  redistributing the plurality of spectral bands included on the plurality of input optical signals onto a plurality of first intermediate optical signals, wherein each of the input optical signals has a plurality of the spectral bands;
  redistributing the plurality of spectral bands included on the plurality of first intermediate optical signals onto a plurality of second intermediate optical signals; and
  redistributing the plurality of spectral bands included on the plurality of second intermediate optical signals onto the plurality of output optical signals,
  wherein the first intermediate optical signals are less in number than the input optical signals and the second intermediate optical signals are less in number than the output optical signals.

17. The method recited in claim 16 wherein the first intermediate optical signals and the second intermediate optical signals are equal in number.

18. The method recited in claim 16 wherein the input optical signals and the output optical signals are equal in number.

19. The method recited in claim 16 wherein redistributing the plurality of spectral bands included on the plurality of input optical signals onto the plurality of first intermediate optical signals comprises, for each of a plurality of distinct groups of the input optical signals, propagating all of the spectral bands on the input optical signals within such distinct group onto a single first intermediate optical signal.

20. The method recited in claim 19 wherein each of the plurality of distinct groups of input optical signals comprises no more than two input optical signals.

21. The method recited in claim 19 wherein redistributing the plurality of spectral bands included on the plurality of input optical signals onto the plurality of first intermediate optical signals further comprises providing an equivalent to each of the plurality of input optical signals to a protection fabric.

22. The method recited in claim 16 wherein redistributing the plurality of spectral bands included on the plurality of second intermediate optical signals onto the plurality of output optical signals comprises, for each of a plurality of distinct groups of output optical signals, propagating all of the spectral bands onto the output optical signals within such distinct group from a single second intermediate optical signal.

23. The method recited in claim 22 wherein each of the plurality of distinct groups of output optical signals comprises no more than two output optical signals.

24. The method recited in claim 22 wherein redistributing the plurality of spectral bands included on the plurality of second intermediate optical signals onto the plurality of output optical signals further comprises providing an equivalent to each of the plurality of second intermediate optical signals to a protection fabric.

25. The method recited in claim 16 wherein redistributing the plurality of spectral bands included on the plurality of first intermediate optical signals onto the plurality of second intermediate optical signals comprises:
  optically splitting each of the plurality of first intermediate optical signals into a plurality of equivalent optical signals;

receiving equivalent optical signals corresponding to each of the plurality of first intermediate optical signals at each of a plurality of working wavelength routing elements;

multiplexing selected spectral bands received on the equivalent optical signals with each of the plurality of working wavelength routing elements; and transmitting respective second intermediate optical signals with the multiplexed spectral bands corresponding to the selection of each of the working wavelength routing elements.

26. The method recited in claim 25 wherein redistributing the plurality of spectral bands included on the plurality of first intermediate optical signals onto a plurality of second intermediate optical signals further comprises:

receiving equivalent optical signals corresponding to each of the plurality of first intermediate optical signals at least one protection wavelength routing element;

multiplexing selected spectral bands received on the equivalent optical signals with the at least one protection wavelength routing element to produce a protection signal; and substituting the protection signal for one of the second intermediate optical signals to compensate for a fault.

27. The method recited in claim 16 further comprising increasing the number of first intermediate optical signals.

28. The method recited in claim 16 further comprising increasing the number of second intermediate optical signals.

29. The method recited in claim 16 further comprising increasing the number of input optical signals and increasing the number of output optical signals.

30. A method for upgrading a an optical cross connect comprising (1) a concentrator for redistributing spectral bands included on a plurality of input optical signals among a smaller number of first intermediate optical signals, (2) a core cross connect for redistributing spectral bands included on the first intermediate optical signals among second intermediate optical signals, and (3) an expander for redistributing spectral bands included on the second intermediate optical signals among a larger number of output optical signals, the method comprising:

upgrading a capacity of the core cross connect;

upgrading a capacity of at least one of the concentrator and expander; and placing upgraded portions of the core cross connect and the at least one of the concentrator and expander in optical communication.

31. The method recited in claim 30 wherein upgrading a capacity of at least one of the concentrator and expander comprises adding an additional concentrator.

32. The method recited in claim 30 wherein upgrading a capacity of at least one of the concentrator and expander comprises adding an additional expander.

33. The method recited in claim 30 wherein:

the core cross connect comprises a working fabric having a plurality of optical components and a protection fabric configured to bypass at least one of the optical components in the event of a fault; and upgrading the capacity of the core cross connect comprises:

upgrading a capacity of the protection fabric; and sequentially, for each of the optical components, bypassing spectral bands received by that optical component to the protection fabric;

thereafter, upgrading that optical component; and thereafter, directing the bypassed spectral bands to that optical component.

34. The method recited in claim 30 wherein:

the concentrator comprises a working fabric having a plurality of optical components and a protection fabric configured to bypass at least one of the optical components in the event of a fault; and upgrading the capacity of at least one of the concentrator and expander comprises upgrading the capacity of the concentrator by:

upgrading a capacity of the protection fabric; and sequentially, for each of the optical components, bypassing spectral bands received by that optical component to the protection fabric;

thereafter, upgrading that optical component; and thereafter, directing the bypassed spectral bands to that optical component.

35. The method recited in claim 30 wherein:

the expander comprises a working fabric having a plurality of optical components and a protection fabric configured to bypass at least one of the optical components in the event of a fault; and upgrading the capacity of at least one of the concentrator and expander comprises upgrading the capacity of the expander by:

upgrading a capacity of the protection fabric; and sequentially, for each of the optical components, bypassing spectral bands received by that optical component to the protection fabric;

thereafter, upgrading that optical component; and thereafter, directing the bypassed spectral bands to that optical component.

36. A method for upgrading an optical cross connect comprising (1) a concentrator for redistributing spectral bands included on a plurality of input optical signals among a smaller number of first intermediate optical signals, (2) a core cross connect for redistributing spectral bands included on the first intermediate optical signals among second intermediate optical signals, and (3) an expander for redistributing spectral bands included on the second intermediate optical signals among a larger number of output optical signals, the method comprising:

adding a plurality of wavelength routing elements to the optical cross connect, each such wavelength routing element adapted for selectively routing wavelength components between a first WRE optical signal and a plurality of second WRE optical signals according to a configurable state of such wavelength routing element; and bypassing spectral bands through at least some of the plurality of wavelength routing elements.

37. The method recited in claim 36 wherein:

bypassing spectral bands through at least some of the plurality of wavelength routing elements comprises bypassing the concentrator; and the method further comprises removing the concentrator.

38. The method recited in claim 36 wherein:

bypassing spectral bands through at least some of the plurality of wavelength routing elements comprises bypassing the concentrator; and the method further comprises reconfiguring the concentrator as one of the wavelength routing elements.

39. The method recited in claim 36 wherein:
bypassing spectral bands through at least some of the plurality of wavelength routing elements comprises bypassing the core cross connect; and
the method further comprises removing the core cross connect.

40. The method recited in claim 36 wherein:
bypassing spectral bands through at least some of the plurality of wavelength routing elements comprises bypassing the core cross connect; and
the method further comprises reconfiguring the core cross connect as one of the wavelength routing elements.

41. The method recited in claim 36 wherein:
bypassing spectral bands through at least some of the plurality of wavelength routing elements comprises bypassing the expander; and
the method further comprises removing the expander.

42. The method recited in claim 36 wherein:
bypassing spectral bands through at least some of the plurality of wavelength routing elements comprises bypassing the expander; and
the method further comprises reconfiguring the expander as one of the wavelength routing elements.

43. The method recited in claim 36 wherein one of the wavelength routing elements forms part of a protection fabric for the upgraded optical cross connect.

44. An optical cross connect for receiving a plurality of input optical signals each having a plurality of spectral bands and transmitting a plurality of output optical signals each having one or more of the spectral bands, the optical cross connect comprising:
means for redistributing the plurality of spectral bands included on the plurality of input optical signals onto a plurality of first intermediate optical signals, each of the input optical signals having a plurality of the spectral bands;
means for redistributing the plurality of spectral bands included on the plurality of first intermediate optical signals onto a plurality of second intermediate optical signals; and
means for redistributing the plurality of spectral bands included on the plurality of second intermediate optical signals onto the plurality of output optical signals,
wherein the first intermediate optical signals are less in number than the input optical signals and the second intermediate optical signals are less in number than the output optical signals.

45. The optical cross connect recited in claim 44 wherein the means for redistributing the plurality of spectral bands included on the plurality of input optical signals onto the plurality of first intermediate optical signals comprises means for propagating all of the spectral bands on the input optical signals within each of a plurality of distinct groups of the input optical signals onto a single first intermediate optical signal.

46. The optical cross connect recited in claim 44 wherein the means for redistributing the plurality of spectral bands included on the plurality of second intermediate optical signals onto the plurality of output optical signals comprises means for propagating all of the spectral bands on each single second intermediate optical signal onto output signals within one of a corresponding plurality of distinct groups of the output optical signals.

47. The optical cross connect recited in claim 44 wherein the means for redistributing the plurality of spectral bands included on the plurality of first intermediate optical signals onto the plurality of second intermediate optical signals comprises:
means for optically splitting each of the plurality of first intermediate optical signals into a plurality of equivalent optical signals;
means for receiving equivalent optical signals corresponding to each of the plurality of first intermediate optical signals at each of a plurality of working wavelength routing elements;
means for multiplexing selected spectral bands received on the equivalent optical signals with each of the plurality of working wavelength routing elements; and
means for transmitting respective second intermediate optical signals with the multiplexed spectral bands corresponding to the selection of each of the working wavelength routing elements.

* * * * *